(12) United States Patent
Pyle et al.

(10) Patent No.: US 10,039,394 B2
(45) Date of Patent: Aug. 7, 2018

(54) HANGING APPARATUS

(71) Applicant: MCS Industries, Inc., Easton, PA (US)

(72) Inventors: Michael Lee Pyle, Sugar Grove, IL (US); Matthew Scott Kressin, Allentown, PA (US)

(73) Assignee: MCS Industries, Inc.

( * ) Notice: Subject to any disclaimer, the term of this patent is extended or adjusted under 35 U.S.C. 154(b) by 0 days.

(21) Appl. No.: 15/696,413

(22) Filed: Sep. 6, 2017

(65) Prior Publication Data

US 2017/0367506 A1  Dec. 28, 2017

Related U.S. Application Data

(63) Continuation of application No. 15/631,047, filed on Jun. 23, 2017.

(60) Provisional application No. 62/353,733, filed on Jun. 23, 2016.

(51) Int. Cl.
| | |
|---|---|
| *A47G 1/16* | (2006.01) |
| *A47G 1/20* | (2006.01) |
| *A47G 1/10* | (2006.01) |
| *F16M 13/02* | (2006.01) |

(52) U.S. Cl.
CPC ............. *A47G 1/1653* (2013.01); *A47G 1/10* (2013.01); *A47G 1/20* (2013.01); *F16M 13/022* (2013.01)

(58) Field of Classification Search
CPC ....... A47G 1/1653; A47G 1/20; F16M 13/022
USPC ...................................................... 248/489
See application file for complete search history.

(56) References Cited

U.S. PATENT DOCUMENTS

| | | |
|---|---|---|
| 2,204,862 A | 12/1937 | Lehman |
| 2,639,109 A | 3/1949 | Hoag |
| 3,384,987 A | 5/1968 | Prechtl |
| 4,216,597 A | 8/1980 | Kocina et al. |
| 4,466,591 A | 8/1984 | Alonzo |
| 4,496,128 A | 1/1985 | Larsen |
| 4,531,315 A | 7/1985 | Sobel |
| 4,611,780 A | 9/1986 | Robertson |
| 4,979,323 A | 12/1990 | Wenkman et al. |
| 5,454,542 A | 10/1995 | Hart |

(Continued)

FOREIGN PATENT DOCUMENTS

| | | |
|---|---|---|
| WO | 2012141780 A2 | 10/2012 |
| WO | 2012141782 A2 | 10/2012 |

OTHER PUBLICATIONS

Gallery Perfect, Photo Frame Wall Gallery Kit, https://www.amazon.com/GALLERY-PERFECT-Piece-Gallery-13FW2901/dp/B00MFL5TOY, Website, Amazon.com. US.

*Primary Examiner* — Anita M King
(74) *Attorney, Agent, or Firm* — Belles Katz LLC

(57) ABSTRACT

A hanging apparatus that includes a frame, a stack, and a bracket. The frame has a front surface, a rear surface opposite the front surface, and an inner surface that defines a display opening. The frame may also have a rabbet defined by a horizontal surface and a vertical surface of the inner surface of the frame and a channel may be formed into the vertical surface. A stack can be positioned within the rabbet of the frame. The hanging apparatus may also include one or more brackets each including a body portion including an edge having a sawtooth configuration. The bracket may also include a mounting portion that facilitates coupling the bracket to the frame by nesting the mounting portion of the bracket within the channel of the frame.

15 Claims, 28 Drawing Sheets

(56) References Cited

U.S. PATENT DOCUMENTS

| | | |
|---|---|---|
| 7,309,053 B2 | 12/2007 | Lin |
| 7,654,500 B1 | 2/2010 | Jump |
| 7,891,124 B1 | 2/2011 | Willis |
| 8,534,627 B2 * | 9/2013 | Kressin ................ A47G 1/1653 211/113 |
| 9,279,538 B1 | 3/2016 | Wening |
| D791,578 S | 7/2017 | Royak |
| 2011/0168858 A1 | 7/2011 | Mears |
| 2017/0055728 A1 | 3/2017 | Krake et al. |
| 2017/0055729 A1 | 3/2017 | Krake et al. |
| 2017/0055730 A1 | 3/2017 | Krake et al. |
| 2017/0055732 A1 | 3/2017 | Krake et al. |

* cited by examiner

HANGING APPARATUS

CROSS-REFERENCE TO RELATED APPLICATIONS

The present application is a continuation of U.S. patent application Ser. No. 15/631,047, filed Jun. 23, 2017, which claims the benefit of U.S. Provisional Patent Application Ser. No. 62/353,733, filed Jun. 23, 2016, the entireties of which are incorporated herein by reference.

FIELD OF THE INVENTION

The present invention relates generally to a hanging apparatus and a bracket for hanging a frame apparatus on a support surface.

BACKGROUND OF THE INVENTION

People like to get creative when hanging art, which may include photographs, pictures, mirrors, diplomas, canvas, tapestry, or the like from walls in their home. In some instances, to conserve wall space or where wall space is at a premium, it is desirable to hang frames or mirrors over a door. There exists a need for a hanging apparatus and a bracket for hanging a frame apparatus that provides an end user with options to hang the apparatus on a wall or over a door.

BRIEF SUMMARY OF THE INVENTION

The present invention is directed to a hanging apparatus that includes a frame, a stack, and a bracket. The frame has a front surface, a rear surface opposite the front surface, and an inner surface that defines a display opening. The frame may also have a rabbet defined by a horizontal surface and a vertical surface of the inner surface of the frame and a channel may be formed into the vertical surface. A stack can be positioned within the rabbet of the frame. The hanging apparatus may also include one or more brackets each including a body portion including an edge having a sawtooth configuration. The bracket may also include a mounting portion that facilitates coupling the bracket to the frame by nesting the mounting portion of the bracket within the channel of the frame.

In one aspect, the invention may be a hanging apparatus comprising: a frame comprising a front surface, a rear surface opposite the front surface, and an inner surface that defines a display opening, a rabbet defined by a horizontal surface and a vertical surface of the inner surface of the frame, and a channel formed into the vertical surface; a stack positioned within the rabbet of the frame; a bracket comprising: a body portion comprising a peripheral edge that includes a first edge portion, a second edge portion extending perpendicularly from the first edge portion, and a third edge portion extending between the first and second edge portions, at least a portion of the third edge portion comprising a sawtooth configuration; and a mounting portion extending from each of the first and second edge portions of the body portion; wherein at least a portion of the mounting portion of the bracket nests within the channel to couple the bracket to the frame and at least partially secure the stack within the rabbet.

In another aspect, the invention may be a hanging apparatus comprising: a frame comprising: a front surface and a rear surface opposite the front surface; an inner surface that defines a display opening, the inner surface of the frame comprising a first linear section, a second linear section opposite the first linear section, a third linear section, and a fourth linear section opposite the third linear section, each of the third and fourth linear sections extending between the first and second linear sections; a rabbet defined by a horizontal surface and a vertical surface of the inner surface of the frame; and an annular channel formed into the vertical surface of the rabbet; a stack comprising a glazing and a backer panel positioned within the rabbet of the frame, the glazing forming a front surface of the stack and the backer panel forming a rear surface of the stack, a portion of the front surface of the stack resting atop the horizontal surface of the rabbet; a first bracket and a second bracket coupled to the frame, each of the first and second brackets formed of a plastic material and comprising: a body portion comprising a peripheral edge that includes a first edge portion, a second edge portion extending perpendicularly from the first edge portion, and a third edge portion extending between the first and second edge portions, at least a portion of the third edge portion comprising a sawtooth configuration; and a mounting portion extending from each of the first and second edge portions of the body portion, the mounting portion comprising: a first vertical wall extending from the first edge portion of the peripheral edge of the body portion and a first horizontal wall extending from the first vertical wall in a direction away from the first edge portion; and a second vertical wall extending from the second edge portion of the peripheral edge of the body portion and a second horizontal wall extending from the second vertical wall in a direction away from the second edge portion; and wherein the first and second horizontal walls of the mounting portions of the first and second brackets nest within the annular channel to couple the first and second brackets to the frame; wherein the first edge portion of the peripheral edge of the body portion of the first bracket is adjacent to the first linear section of the inner surface of the frame, the second edge portion of the peripheral edge of the body portion of the first bracket is adjacent to the third linear section of the inner surface of the frame, and the third edge portion of the peripheral edge of the body portion of the first bracket extends between the first and third linear sections of the inner surface of the frame; and wherein the first edge portion of the peripheral edge of the body portion of the second bracket is adjacent to the second linear section of the inner surface of the frame, the second edge portion of the peripheral edge of the body portion of the second bracket is adjacent to the third linear section of the inner surface of the frame, and the third edge portion of the peripheral edge of the body portion of the second bracket extends between the second and third linear sections of the inner surface of the frame.

In yet another aspect, the invention may be a hanging apparatus comprising: a frame comprising a front surface, a rear surface opposite the front surface, and an inner surface that defines a display opening, a rabbet defined by a horizontal surface and a vertical surface of the inner surface of the frame; a stack comprising a backer panel positioned within the rabbet of the frame, the backer panel comprising a first surface and a second surface opposite the first surface; a bracket comprising a peripheral edge that includes a first edge portion, a second edge portion extending perpendicularly from the first edge portion, and a third edge portion extending between the first and second edge portions, at least a portion of the third edge portion comprising a sawtooth configuration; and wherein the bracket is positioned within the rabbet of the frame and wraps around a portion of the backer panel to couple the bracket to the backer panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1A:
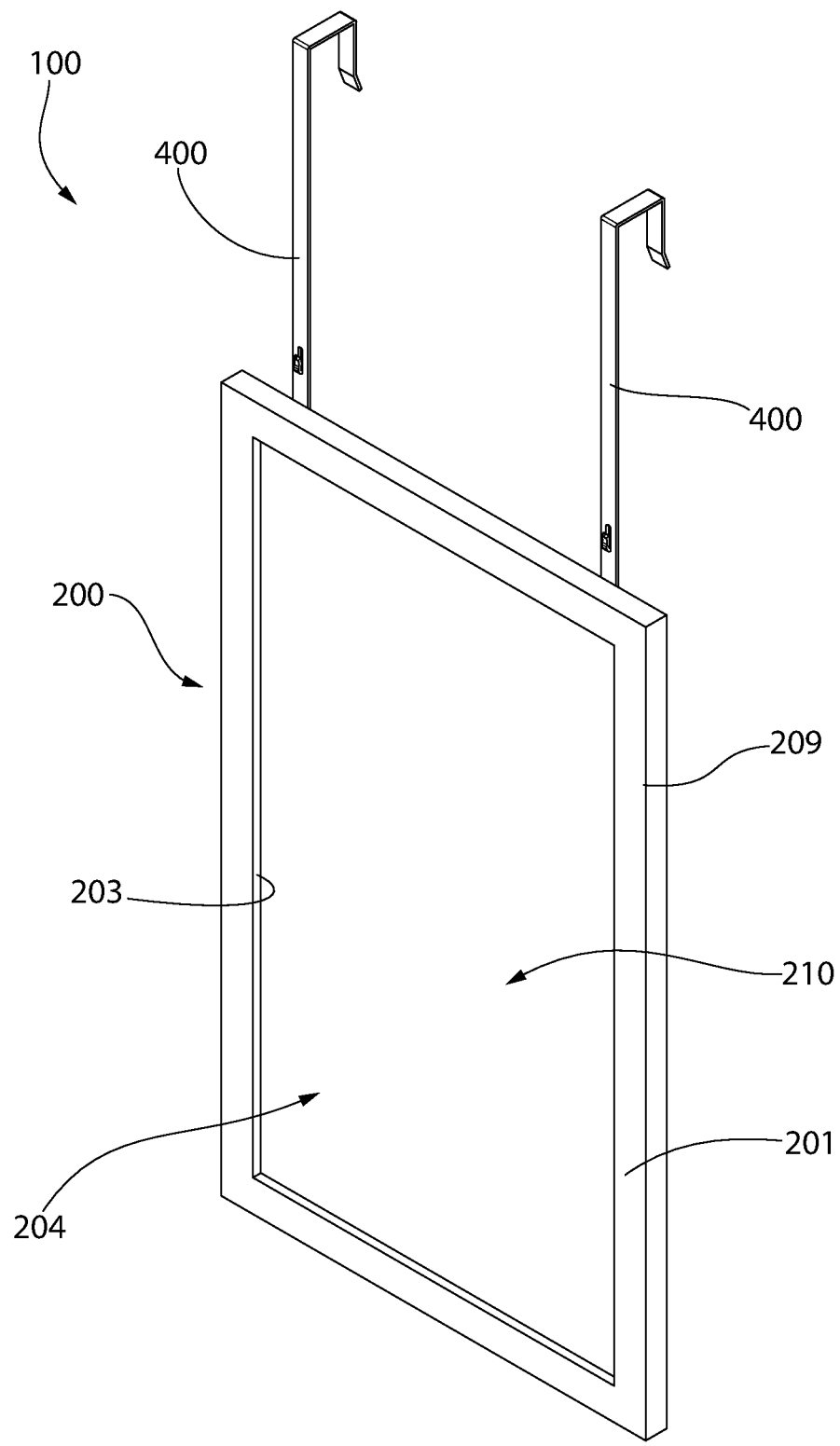
FIG. 1A is a front perspective view of a hanging apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 1B:
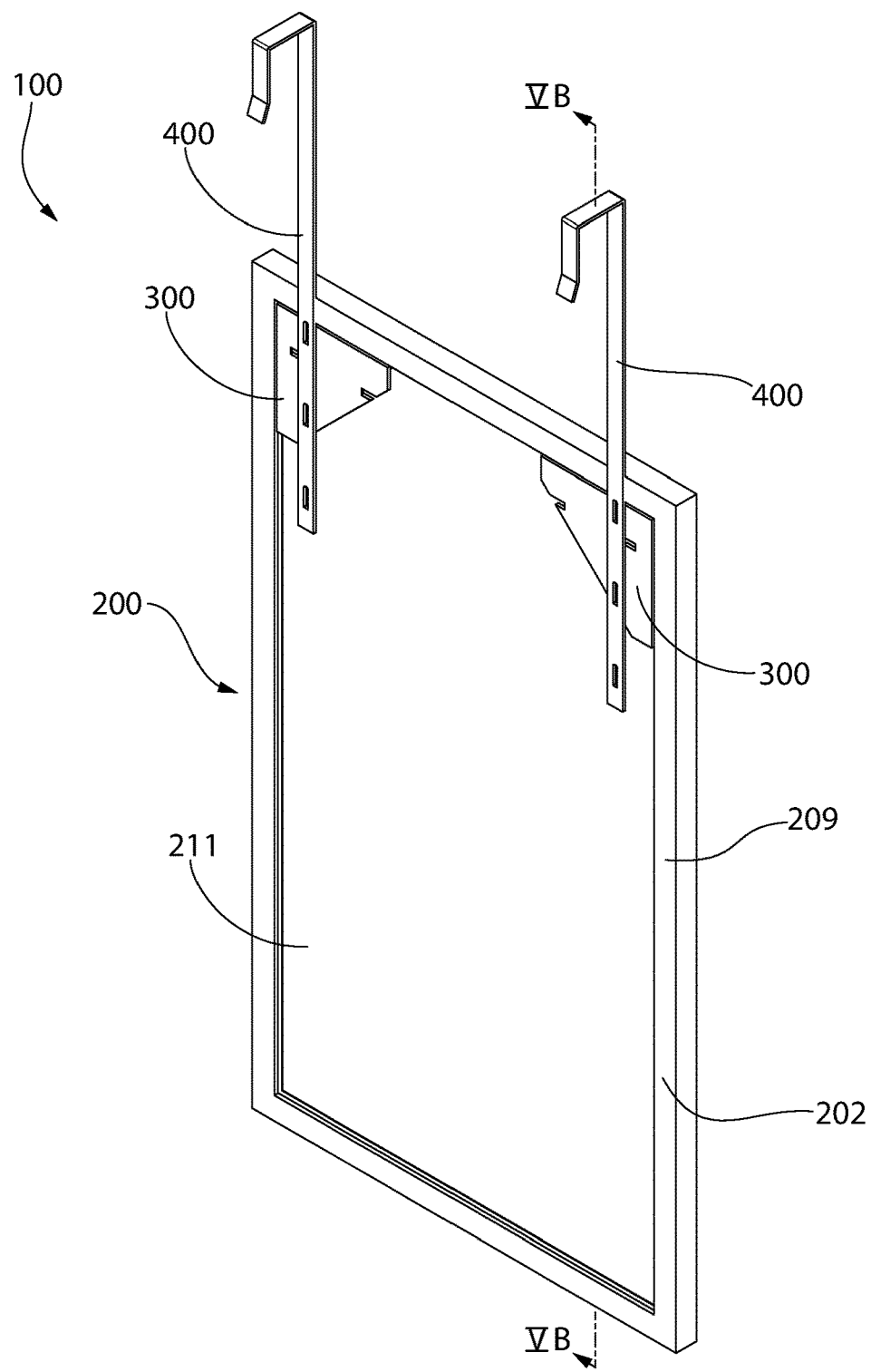
FIG. 1B is a rear perspective view of the hanging apparatus of FIG. 1A.
Figure 2:
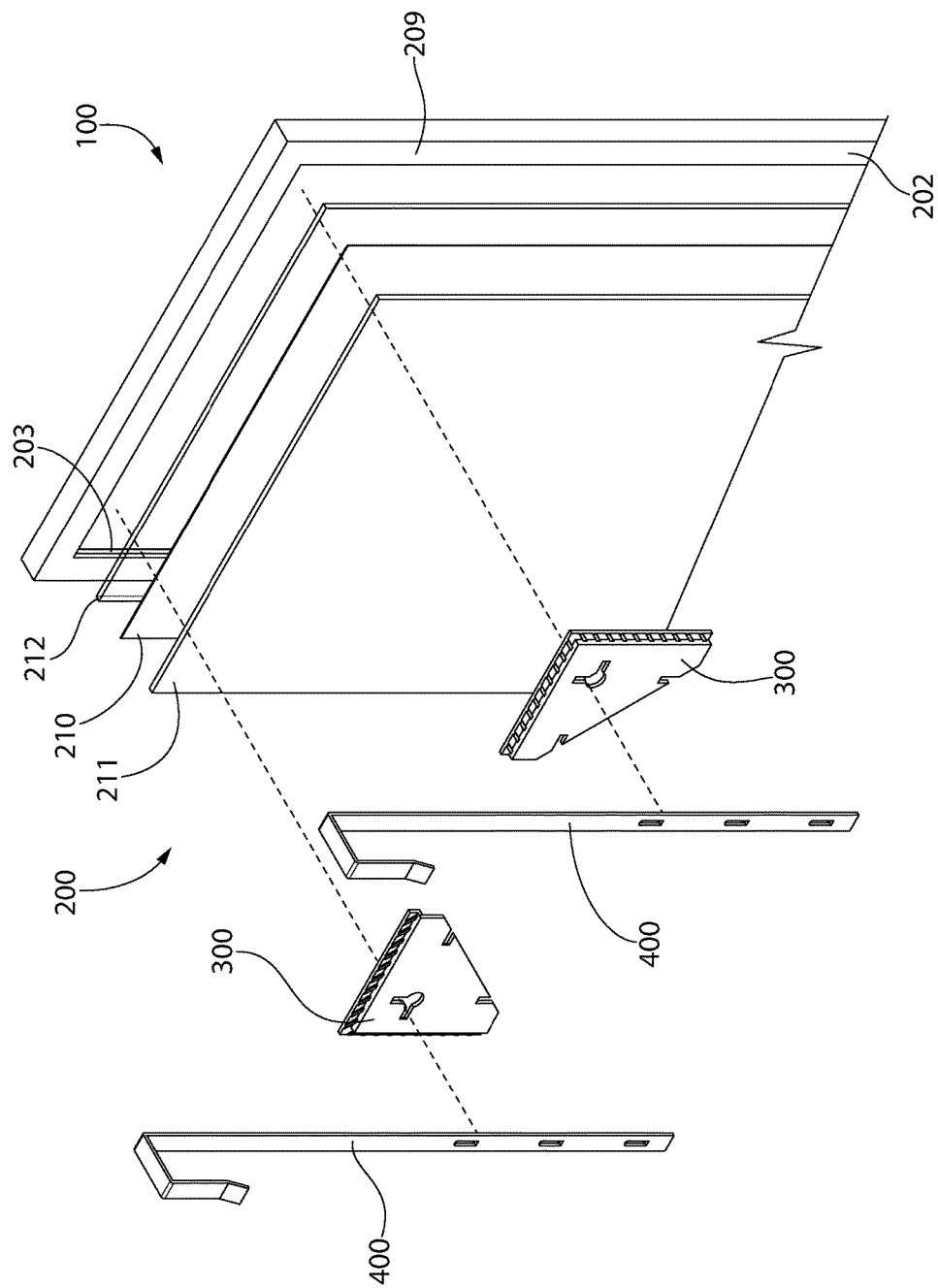
FIG. 2 is a rear perspective exploded view of the hanging apparatus of FIG. 1A illustrating a frame apparatus, two brackets, and two over-the-door hanging members.

Referring to FIGS. 1A, 1B, and 2 concurrently, a hanging apparatus 100 is illustrated in accordance with an embodiment of the present invention. The hanging apparatus 100 generally comprises a frame apparatus 200, one or more brackets 300, and one or more over-the-door hanging members 400. In the exemplified embodiment, there are two brackets 300 and two over-the-door hanging members 400, but there may be one, three, four or the like of each of those components in other embodiments. As will be appreciated from the description below, the brackets 300 are coupled to the frame apparatus 200 and used to hang the frame apparatus 200 from a vertical surface such as a door or a wall. Specifically, each of the over-the-door hanging members 400 may be detachably coupled to one of the brackets 300 for hanging the frame apparatus 200 from a door. In some embodiments the over-the-door hanging members 400 may be omitted and the brackets 300 may be hung from a piece of hardware, such as a screw, an anchor, a nail, or the like, that is protruding from the vertical surface on which the hanging apparatus 100 is intended to be hung. Of course, the frame apparatus 200 may be hung from surfaces that are not completely vertical in some embodiments.

In the exemplified embodiment, the frame apparatus 200 may be configured to retain or otherwise support a display item 210 that is desired to be displayed, for example, in a home or office environment. For example, the frame apparatus 200 may support artwork, a poster, photographs, a mirror, a cork board, a dry erase board, canvas, or the like. Thus, any type of article or media that is desired to be hung within a home or office may be supported by the frame apparatus 200. The invention is not to be particularly limited by the type of display item 210 that is retained by the frame apparatus 200 in all embodiments. As will be discussed in greater detail below, in the exemplified embodiment the frame apparatus 200 comprises a frame 209, a backer panel 211, and a glazing 212. The frame 209 of the frame apparatus 200 may be a standard frame having a rabbet within which the display item 210, the backer panel 211 and the glazing 212 are positioned. However, in other embodiments the frame apparatus 200 may include a frame and the display item may be a canvas that is coupled to the frame in a conventional manner. In such an embodiment the frame of the frame apparatus 200 may not have a rabbet. The structural details of the frame apparatus 200 will dictate the manner in which the bracket 300 may be coupled to the frame apparatus 200.

In the exemplified embodiment, the frame apparatus 200 comprises a frame 209, a backer panel 211, and a glazing 212. The backer panel 211 and the glazing 212 may be referred to herein collectively as a stack. When fully assembled, the display item 210 is sandwiched between the backer panel 211 and the glazing 212 within a rabbet of the frame 209, as discussed in more detail below with reference to FIGS. 5A and 5B. In such embodiments, the brackets 300 may be coupled to the frame 209 by being mounted to the frame within the rabbet. Of course, in other embodiments, for example where the display item 210 is canvas, the frame apparatus 200 may include the frame 209 but may omit the backer panel 211 and the glazing 212 because they are not needed in such embodiments. In such embodiments, the canvas may be coupled directly to the frame using staples or the like. Furthermore, in such embodiments the brackets 300 may be coupled to the frame 209 via hardware that couples the brackets 300 to the exterior of the frame 209. For example, the brackets 300 may be nailed or screwed onto the frame 209 in such a manner that they are securely coupled to the frame 209 and available to facilitate hanging of the frame 209 as discussed herein. Thus, the particular configuration of the frame apparatus 200 may dictate the manner in which the bracket 300 is coupled to the frame apparatus 200.

In the exemplified embodiment, the frame apparatus 200 (and the display item 210 supported thereby) is rectangular in shape. However, the invention is in no way limited to the shape of the frame apparatus 200 or the article retained by the frame apparatus 200 and the frame apparatus 200 may take on any polygonal shape (triangular, square, rectangular, hexagonal, octagonal, etc.) or the frame apparatus 200 (and the article(s) retained thereby) may be circular in shape. The frame 209 of the frame apparatus 200 has a front surface 201, a rear surface 202, and an inner surface 203 that defines a display opening 204 through which the article can be viewed. Thus, the display item 210 is at least partially visible through the display opening 204 of the frame 209.

FIG. 2 illustrates a rear perspective exploded view of the hanging apparatus 100. Specifically, in FIG. 2 the brackets 300, the over-the-door hanging members 400, the backer panel 211, the display item 210, and the glazing 212 are exploded away from the frame 209 and from each other. A detailed description of the brackets 300, the over-the-door hanging members 400, and the frame 209 will be provided below.

The glazing 212 can be any type of glazing that is used for framing. In certain embodiments, the glazing 212 may be a panel of glass, acrylic, plexiglass, polystyrene or other material that allows the viewing of the display item 210 therethrough. Of course other materials can be used in other embodiments of the invention for the glazing 212. In certain embodiments, the glazing 212 is formed of a substantially transparent material so that the display item(s) 210 being framed therein are visible through the glazing 212. As used herein, the term "transparent" includes the presence of colored tint. In other embodiments, the glazing 212 may be at least partially translucent. In still other embodiments of the invention, the glazing 212 may be omitted from the frame apparatus 200.

The backer panel 211 can be formed of a hard or soft plastic material, such as a thermoplastic material or the like. Alternatively, the backer panel 211 can be formed of a cardboard, wood, metal or other material as desired. In certain embodiments, the backer panel 211 may be a ring-like structure rather than a sheet-like structure. In other embodiments, the frame apparatus 200 may also include a filler panel between the backer panel 211 and the display item 210. The filler panel takes up space and reduces potential damage by adding a layer of protection for the display item 210. The filler panel can also be used to provide the necessary thickness to the stack to ensure adequate compression to hold the stack in the frame 209. In embodiments that include it, the filler panel may be a sheet of corrugated material or other medium, such as a corrugated metal, corrugated cardboard, plastic, fiberboard or the like. The filler sheet can be included as a part of the frame apparatus 200 or omitted as desired.

Figure 17:
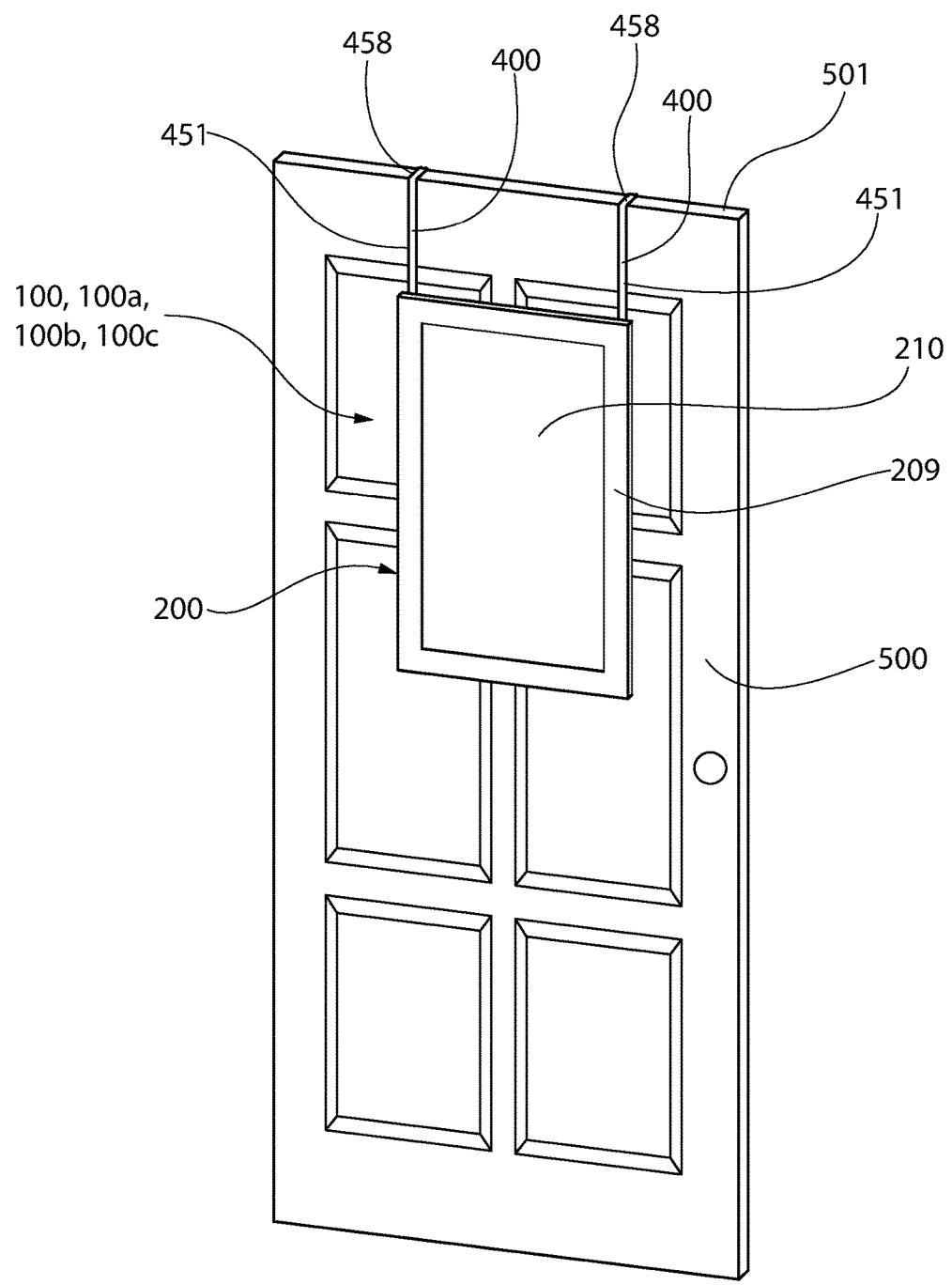
FIG. 17 is a schematic illustrating one of the hanging apparatuses of FIGS. 1, 8 and 13 hanging from a door.
Figure 18:
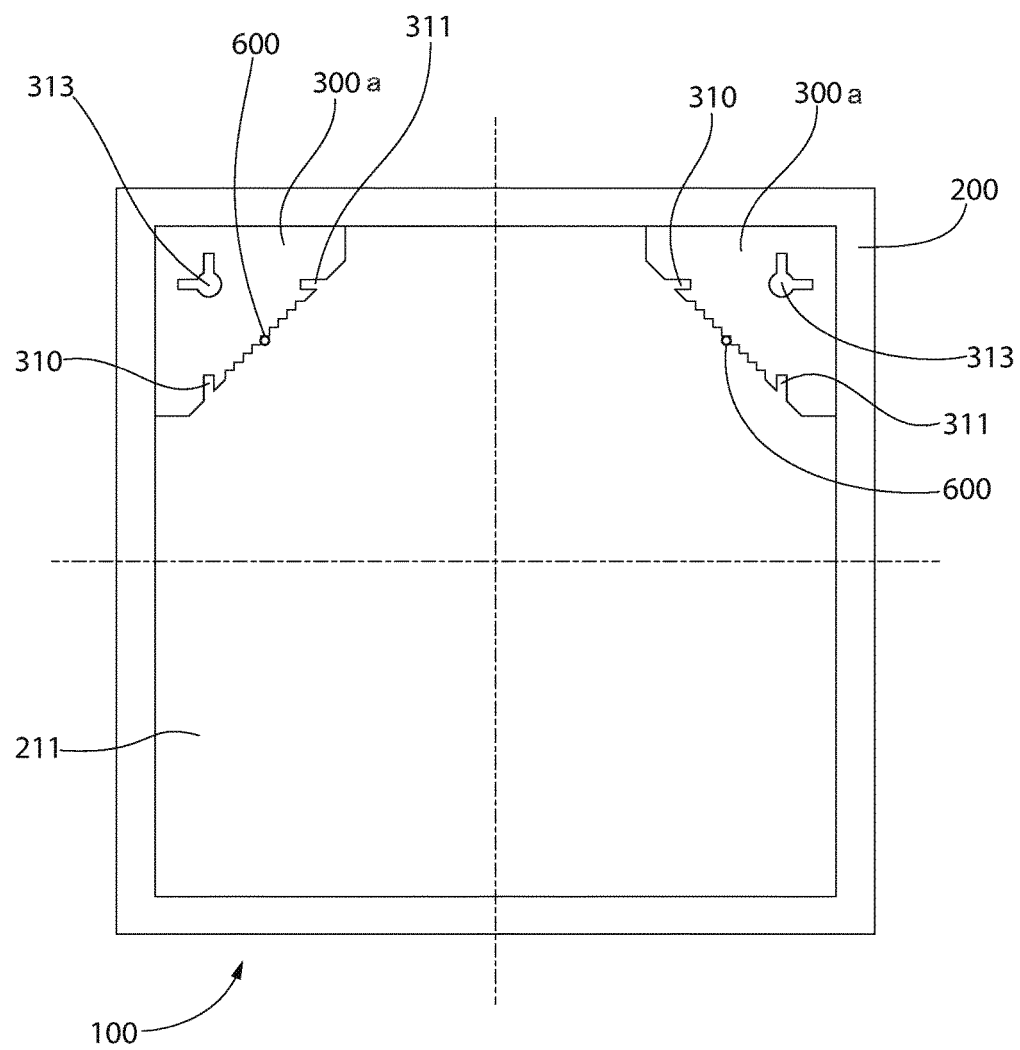
FIG. 18 is a schematic illustrating one of the hanging apparatuses of FIGS. 1, 8 and 13 hanging from a wall.

To assemble the hanging apparatus 100, first the glazing 212, the display item 210 and the backer panel 211 are inserted into the rabbet of the frame 209 in that order. Next, the brackets 300 are coupled to or secured to the frame apparatus 200. In the exemplified embodiment, this is achieved by inserting a portion of the brackets 300 into the rabbet of the frame 209, although the brackets 300 may be coupled directly to the rear surface 202 of the frame 209 in other embodiments (discussed below with reference to FIGS. 13-16C). Furthermore, as will be discussed further below, in some embodiments the brackets 300 may be coupled to the backer panel 211 and then the backer panel 211 placed within the rabbet of the frame 209 in the normal manner to achieve coupling of the brackets 300 to the frame apparatus 200. Next, the over-the-door hanging members 400 may be mounted onto the brackets 300. The over-the-door hanging members 400 can then be hung from a top edge of a door as best shown in FIG. 17. Of course, as noted herein the over the over-the-door hanging members 400 may be omitted and the brackets 300 may be mounted to a nail, screw, or other hardware as best shown in FIG. 18.

In the exemplified embodiment, the brackets 300 may be repetitively coupled to the frame apparatus 200 and may be repositioned along the frame apparatus 200 as desired. For example, if it is desired to hang the frame apparatus 200 in a portrait orientation, the brackets 300 will be coupled to the frame 209 or to the frame apparatus 210 near a top of the frame 209 when the frame 209 is in the portrait orientation. Similarly, if it is desired to hang the frame 209 in a landscape orientation, the brackets 300 will be coupled to the frame 209 or to the frame apparatus 210 near a top of the frame 209 when the frame 209 is in the landscape orientation. Thus, the brackets 300 may be positioned at different locations along the frame 209 to facilitate a desired hanging orientation of the frame apparatus 200.

Figure 3A:
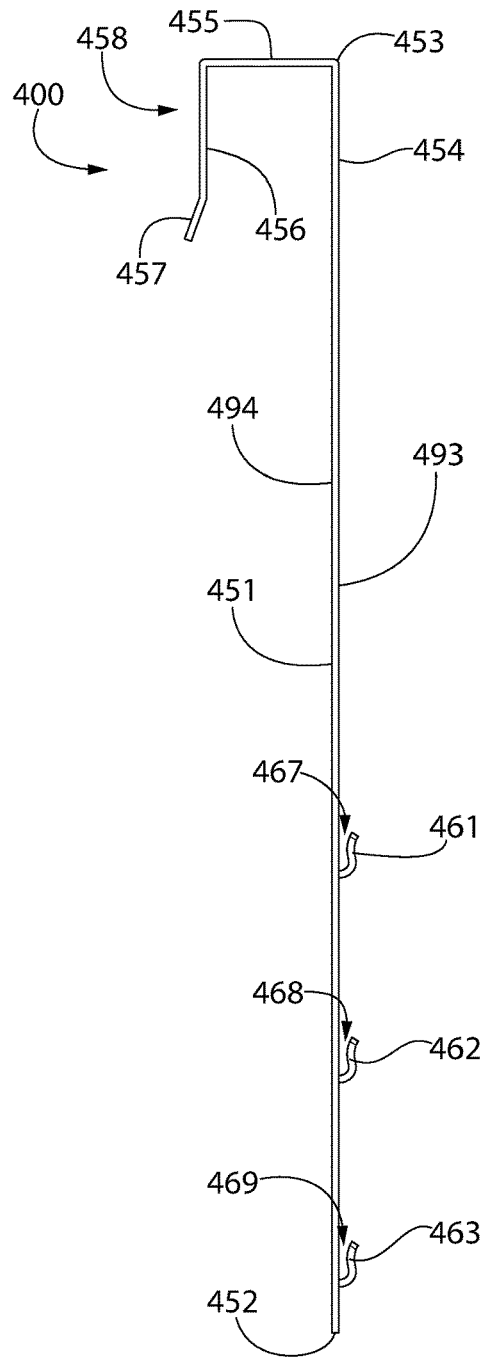
FIGS. 3A and 3B are side and front perspective views, respectively, of the over-the-door hanging members of the hanging apparatus of FIG. 1A.
Figure 3B:
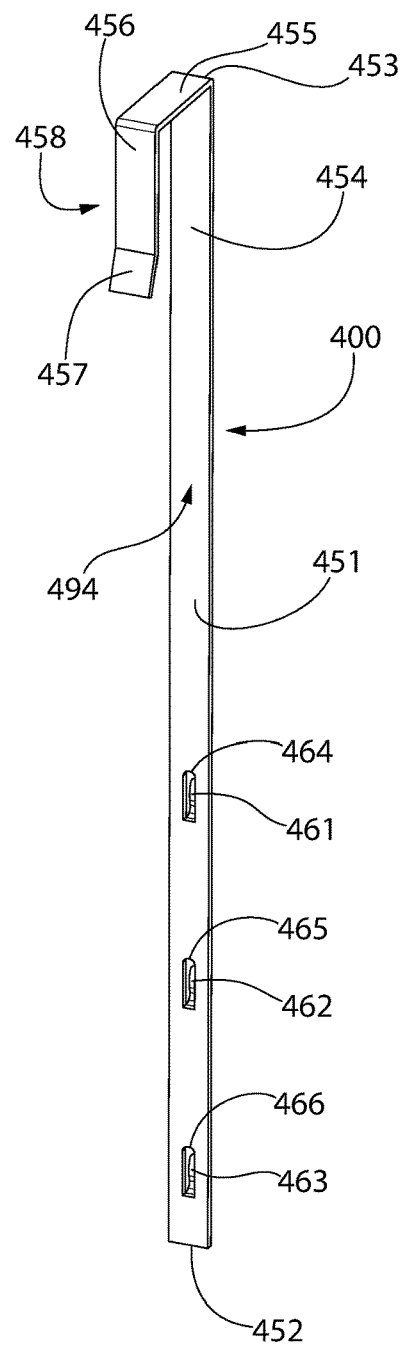

Referring to FIGS. 3A and 3B, the over-the-door hanging members 400 will be described. The over-the-door hanging members 400 are identical in structure in the exemplified embodiment and thus although two are included in the hanging apparatus 100, only one will be described in detail. The over-the-door hanging member 400 comprises an elongated body 451 extending from a first end 452 to a second end 453 and a U-shaped member 458 located at the second end 453 of the elongated body 451. The elongated body 451 comprises a front surface 493 and an opposite rear surface 494. In the exemplified embodiment, the over-the-door hanging member 400 is an integrally formed structure formed by appropriately bending a flat strip of flexible metal, such as a sheet metal. Of course, other materials and formation techniques can be used, including the molding, milling and/or lathing of plastics, matrix materials, or any other material capable of withstanding the required load-bearing requirements. Moreover, while the over-the-door hanging member 400 is preferably flexible in nature, it may be constructed to be substantially rigid if desired.

The generally U-shaped member 458 is provided at the second end 453 of the over-the-door hanging member 400 and extends from the rear surface 494 of the elongated body 451. The U-shaped member 458 is sized and shaped for sliding over and engaging a top edge of a door. The U-shaped member 458 comprises a front portion 454 (which is formed by the elongated body 451), a top portion 455, and a back portion 456 that terminates with an angled flange 457. The front portion 454 corresponds to a top portion of the elongated body 451 and it encompasses the second end 453 of the elongated body 451. The top portion 455 extends outward from the rear surface 494 of the elongated body 451 at the second end 453 so as to form an approximately 90 degree angle with the front portion 454 of the U-shaped member 458. Although the top portion 455 is described as extending at an approximately 90 degree angle from the front portion 454 of the U-shaped member 458, it may extend at other angles if desired. The back portion 456 of the U-shaped member 458 extends downwardly from the top portion 455 at an approximately 90 degree angle, thereby forming the U-shaped member 458 of the over-the-door hanging member 400. The angled flange 457 diverges slightly outward from the back portion 456 at an obtuse angle in order to facilitate placement of the U-shaped member 458 over a top edge of a door as will be described below with reference to FIG. 17.

The U-shaped member 458 is preferably made of a flexible material so that it can bend and more easily fit over doors with varying widths. In other words, it is preferable that a user can extend the distance between the back portion 456 and the front portion 454 of the U-shaped member 458 by applying an outward force on the flange 457. The top portion 455 of the U-shaped member 458 is made wide enough to accommodate a conventional door width. The thickness of the material, and hence its flexibility, may be chosen so that the U-shaped member 458 is sufficiently rigid to avoid deformation under the load of the frame apparatus 200 and display item 210 retained thereby and yet is thin enough to fit over the top of the door without creating clearance problems with respect to the cap of the door frame. In use, a user may grip and pull on the flange portion 457 of the U-shaped member 458 to assist with the attachment of the over-the-door hanging member 400 to the top edge of a door as illustrated in FIG. 17.

The over-the-door hanging member 400 further comprises first, second, and third hooks 461, 462, 463. Each of the hooks 461-463 extends from the front surface 493 of the elongated body 451 of the over-the-door hanging ember 400. Although three hooks 461-463 are illustrated in the exemplified embodiment, a single hook, two hooks, or more than three hooks may be used in alternative embodiments. In the exemplified embodiment, the hooks 461-463 are integrally formed with the over-the-door hanging member 400. More specifically, the hooks 461-463 may be formed by punching an appropriate pattern in the elongated body 451 of the over-the-door hanging member 400 and subsequently bending the in-plane tab out of plane and into the desired shape. As a result, apertures 464-466 (i.e. holes) are formed in the over-the-door hanging member 400 behind the hooks 461-463. The apertures 464-466 enable the over-the-door hanging member 400 to be manufactured with less material and prevent the over-the-door hanging member 400 from prematurely deteriorating due to the friction of the brackets 300 against the hooks 461-463. Of course, the apertures 464-466 need not be included as a part of the over-the-door hanging member 400 and the hooks 461-463 can be separate structures that are subsequently welded, fastened, clamped or otherwise connected to the over-the-door hanging member 400.

The hooks 461-463 each extend outwardly from the front surface 493 of the over-the-door hanging member 400 and upwardly toward the second end 453. Each of the hooks 461-463 extends from a base at which it connects to the over-the-door hanging member 400 to a distal end at which it terminates. Except at the base, each of the hooks 461-463 is spaced apart from the front surface 493 of the elongated body 451 so that a slot is formed between the hooks 461-463 and the elongated body 451. The over-the-door hanging member 400 is coupled or mounted to the brackets 300 by inserting a portion of the bracket 300 into the slot so that the bracket 300 becomes sandwiched between the hooks 461-463 and the front surface 493 of the elongated body 451. The hooks 461-463 are preferably in a linear vertical alignment with one another on the front surface 493 of the over-the-door hanging member 400. The hooks 461-463 each have a length which is equal to the distance from the bases to the distal ends of the hooks 461-463, respectively.

In the exemplified embodiment, the hooks 461, 462, 463 are S-shaped tabs. The S-shape of the hooks 461-463 may be preferred to accomplish an efficient attachment between the over-the-door hanging members 400 and the brackets 300 as will be described below. The invention, of course, is not limited by the shape of the hooks and other shapes may be used as would be known to persons skilled in the art. For example, the hooks 461-463 could simply be straight tabs extending outwardly in an angled fashion from the over-the-door hanging member 400 for slidable mating with the edges of the brackets 300 as described below. Furthermore, it should be understood that the term hooks is intended to include any tab-type structure that may extend outwardly from the over-the-door hanging member 400 in a manner that facilitates slidable mating with the edges of the brackets 300 and is not intended to be in any other way limiting of the present invention.

As mentioned above, the hooks 461, 462, 463 extend outwardly and upwardly from the front surface 493 of the over-the-door hanging member 400 in a spaced part manner so that slots 467, 468, 469 are formed between the hooks 461, 462, 463 and the front surface 493 of the over-the-door hanging member 400. The slots 467, 468, 469 have an open top end that provides access into the slots 467, 468, 469 so that the edges of the brackets 300 can be lowered into the slots 467, 468, 469 during mounting of the brackets 300 (which may be coupled to the frame apparatus 200 as described herein) to the over-the-door hanging members 400.

Referring to FIGS. 4A-4D, one embodiment of the brackets 300 will be described. The brackets 300 may be formed from any desired material, including metals, plastics, or the like, that permits attachment of the brackets 300 to the frame apparatus 200, and permits mounting of the over-the-door hanging members 400 to the brackets 300 (or mounting of the brackets 300 to hardware preinstalled on a wall, door, or other support surface). The brackets 300 have a body portion 340 and a mounting portion 345 extending from the body portion 340 for mounting the bracket 300 to the frame apparatus 200. The body portion 340 of the brackets 300 comprise a first surface 301, a second surface 302, and a peripheral edge 303 extending between the first and second surfaces 301, 302.

The peripheral edge 303 of the body portion 340 comprises a first edge portion 330, a second edge portion 331, and a third edge portion 332. In the exemplified embodiment, the bracket 300 has the shape of a truncated or clipped triangle such that two of the three corners of the triangle have been clipped or cut off. As a result, the third edge portion 332 is not a continuous linear edge like the first and second edge portions 330, 331, but rather has three linear sections. Specifically, the third edge portion 332 has a first linear section 333, a second linear section 334, and a third linear section 335. The first linear section 333 extends orthogonally from the first edge portion 330 to the third linear section 335, the second linear section 334 extends orthogonally from the second edge portion 331 to the third linear section 335, and the third linear section 335 extends between the first and second linear sections 333, 334. The third linear section 335 is oriented at an obtuse angle relative to each the first and second linear sections 333, 334, and the first and second linear sections 333, 334 extend along axes that are perpendicular to one another. In the exemplified embodiment, the first linear section 333 extends parallel to the second edge portion 331 and the second linear section 334 extends parallel to the first edge portion 330.

Of course, in other embodiments the bracket 300 may take on other shapes such as triangular (non-truncated), square, rectangular, or the like. In any case, two of the edges of the bracket 300 are coupled to the frame apparatus 200 and not exposed when viewing the hanging apparatus 100 from the rear surface 202 of the frame 209. In the exemplified embodiment where the bracket 300 has a triangular shape, a single edge (i.e., the third edge portion 332) is exposed at the rear surface 202 of the frame 209 (see FIG. 1B). If the bracket 300 were square or rectangular, two of the four edge portions would be exposed at the rear surface 202 of the frame 209. However, for purposes of the invention described herein, the two exposed edge portions of the bracket would be considered the third edge portion. Stated another way, the third edge portion comprises any portion of the peripheral edge 303 of the bracket 300, regardless of the shape of the bracket 300, that is exposed or non-adjacent to the inner surface 203 of the frame 209 when viewing the hanging apparatus 100 from the rear surface 202 of the frame 209.

In the exemplified embodiment, the first edge portion 330 extends along a first edge axis Z-Z, the second edge portion 331 extends along a second edge axis Y-Y, and the third linear section 335 of the third edge portion 332 extends along a third edge axis X-X. The first and second edge axes Z-Z, Y-Y are perpendicular to one another. Furthermore, the third edge axis X-X forms an acute angle with each of the first and second edge axes Z-Z, Y-Y.

The bracket 300 includes features that permit coupling of the over-the-door hanging members 400 to the bracket 300 and features that permit mounting the bracket 300 to a screw, anchor, or other hardware attached to a wall or other vertical surface. In that regard, in the exemplified embodiment the bracket 300 comprises first and second slots 310, 311 that extend from the third linear section 335 of the third edge portion 332 inwardly into the bracket 300. In the exemplified embodiment, each of the first and second slots 310, 311 extend through the entire thickness of the body portion 340 of the bracket 300 to form openings through the body portion 340 of the bracket 300. Of course, the slots 310, 311 may not extend through the entire thickness of the body portion 340 in other embodiments while still achieving their function of permitting the over-the-door hanging members 400 (or other hardware) to couple to the brackets 300 at the location of the slots 310, 311.

In the exemplified embodiment, the first slot 310 extends from the third edge portion 332 towards the second edge portion 331 and the second slot 311 extends from the third edge portion 332 towards the first edge portion 330. Each of the first and second slots 310, 311 is open at the third edge portion 332 of the peripheral edge 303 of the body portion 340 of the bracket 300. The first and second slots 310 are spaced apart along the third linear section 335 of the third edge portion 332, such that the first slot 310 is positioned adjacent to the first linear section 333 of the third edge portion 332 and the second slot 311 is positioned adjacent to the second linear section 334 of the third edge portion 332.

The first slot 310 is elongated in a direction that is parallel to the first edge portion 330 of the peripheral edge 303. The first slot 310 extends from an opening 360 in the third edge portion 332 to a terminal end 361. The first slot 310 is elongated along a first axis A-A that is parallel to the first edge portion 330 of the peripheral edge 303. The second slot 311 is elongated in a direction that is parallel to the second edge portion 331 of the peripheral edge 303. The second slot 311 extends from an opening 362 in the third edge portion 332 to a terminal end 363. The second slot 311 is elongated along a second axis B-B that is parallel to the second edge portion 331 of the peripheral edge 303. Furthermore, the third edge portion 332 of the peripheral edge 303 intersects the first and second axes A-A, B-B at an acute angle.

The bracket 300 also includes an aperture 313 that is spaced from each of the first and second slots 310, 311. The aperture 313 extends through the body portion 340 from the first surface 301 to the second surface 302. The aperture 313 comprises an entry section 314 and first and second nesting sections 315, 316 extending from the entry section 314. In the exemplified embodiment, the entry section 314 of the aperture 313 has a circular shape and each of the first and second nesting section 315, 316 of the aperture 313 are linear and elongated as they extend from the entry section 314. Furthermore, the first and second nesting sections 315, 316 are spaced apart by approximately 90° along the circumference of the entry section 314. Specifically, the first nesting section 315 extends from the entry section 314 towards the second edge portion 331 of the peripheral edge 303 and the second nesting section 316 extends from the entry section 314 towards the first edge portion 330 of the peripheral edge 303.

The first nesting section 315 of the aperture 313 is aligned with the first slot 310 such that the first slot 310 and the first nesting section 315 are aligned along the first axis A-A that is parallel to the first edge portion 330 of the peripheral edge 303. Furthermore, in the exemplified embodiment the first nesting section 315 of the aperture 313 is elongated along the first axis A-A. Similarly, the second nesting section 316 of the aperture 313 is aligned with the second slot 311 such that the second slot 311 and the second nesting section 316 are aligned along the second axis B-B that is parallel to the second edge portion 331 of the peripheral edge 303. Furthermore, in the exemplified embodiment the second nesting section 316 of the aperture 313 is elongated along the second axis B-B. The first axis A-A in the exemplified embodiment is parallel with the first edge portion 330 of the peripheral edge 303 and the second axis B-B in the exemplified embodiment is parallel with the second edge portion 331 of the peripheral edge 303. Furthermore, in the exemplified embodiment the first and second axes A-A, B-B are perpendicular to one another.

Figure 4A:
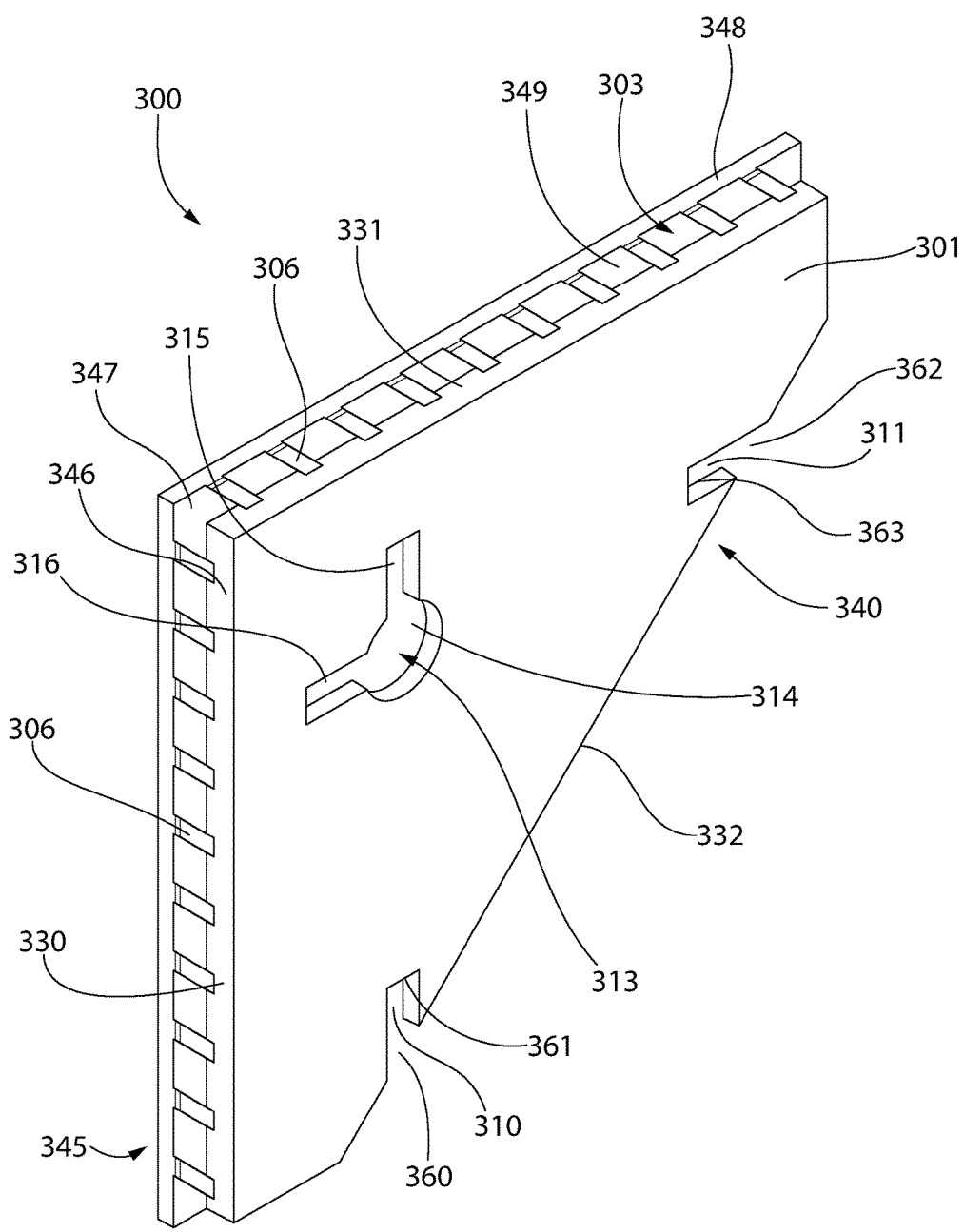
FIGS. 4A-4D are front perspective, front, rear, and top views, respectively, of the bracket of the hanging apparatus of FIG. 1A in accordance with one embodiment of the present invention.
Figure 4B:
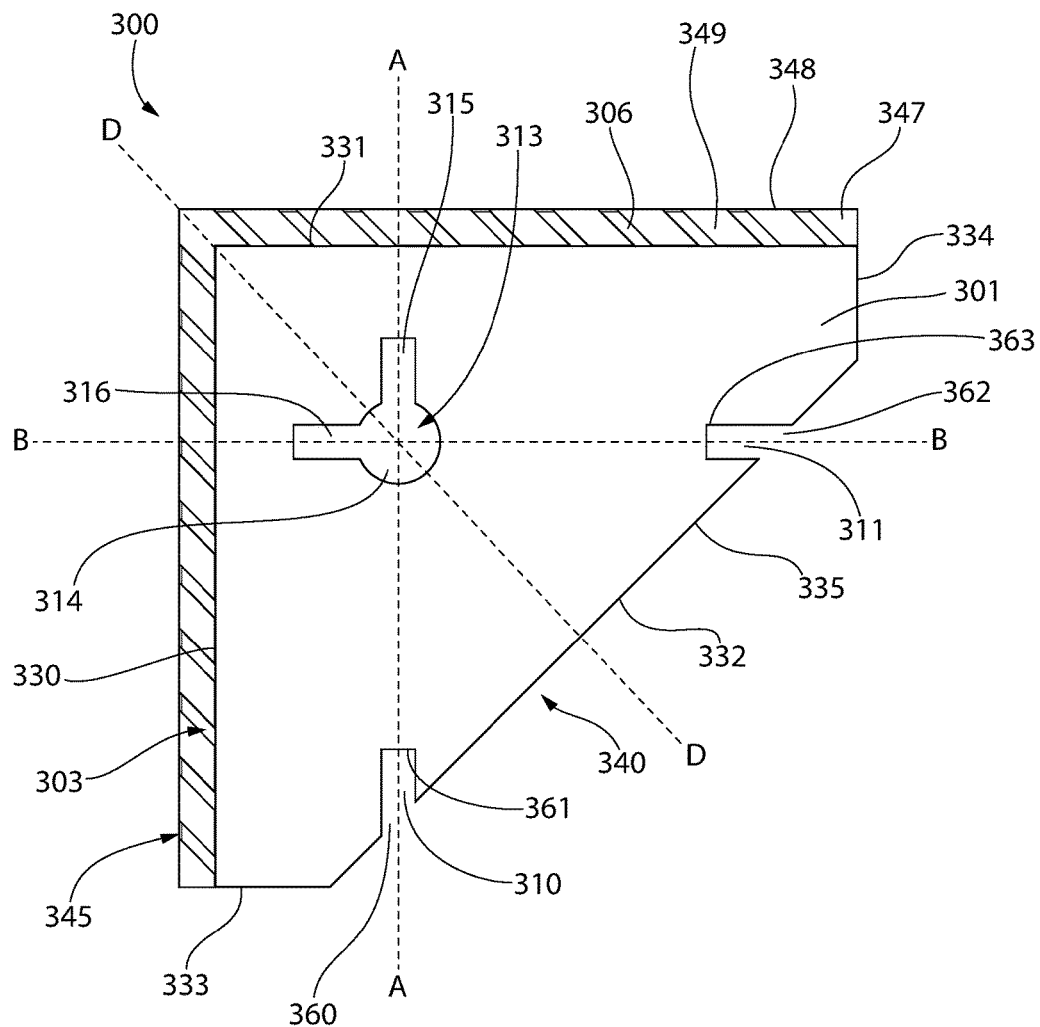
Figure 4C:
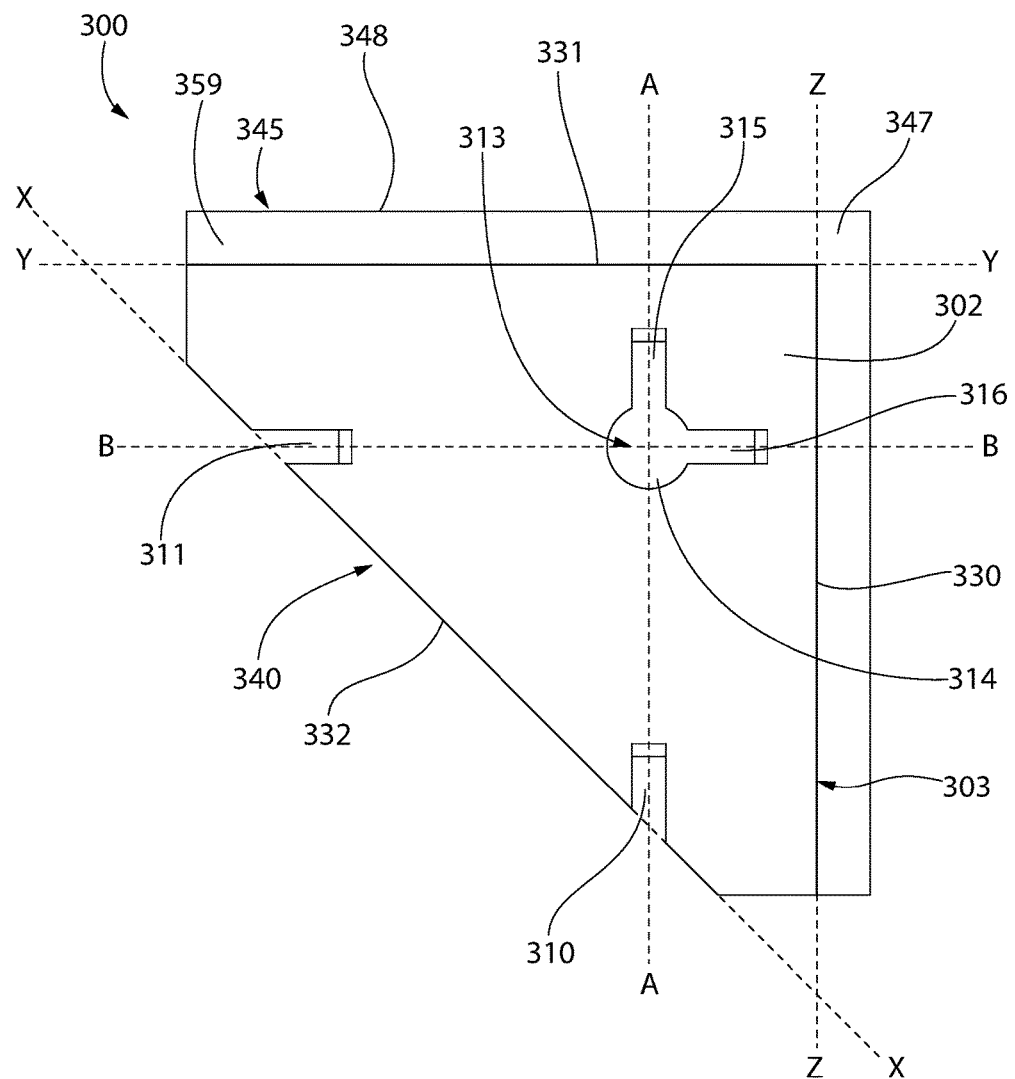
Figure 4D:
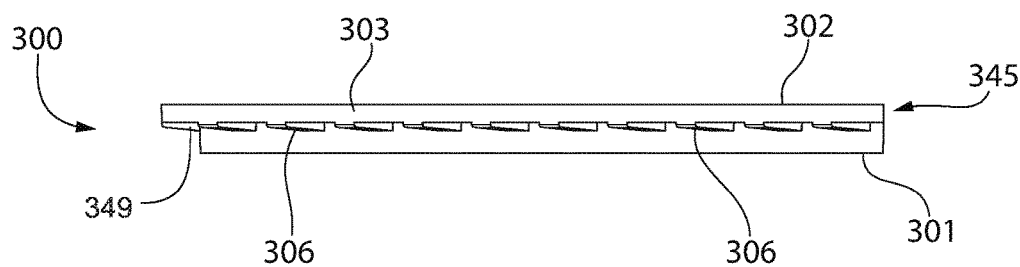

The spacing of the first and second slots 310, 311 from each other and from the first and second edge portions 330, 331 of the peripheral edge 303 is consistent. As a result, as seen in FIG. 4B, in the exemplified embodiment the bracket 300 is symmetric about a reference plane D-D that intersects the location at which the first and second edge portions 330, 331 of the peripheral edge 303 connect and intersects the third edge portion 332 at its center-point (i.e., at a location that is equidistant from the first and second slots 310, 311). Furthermore, the reference plane D-D intersects both of the first and second axes A-A, B-B at an approximately 45° angle.

Due to the alignment of the first nesting section 315 of the aperture 313 with the first slot 310, one of the over-the-door hanging members 400 may be mounted to the bracket 300 by inserting two adjacent ones of the hooks 461-463 of the over-the-door hanging member 400 into the first slot 310 and the first nesting section 315 of the aperture 313, respectively (one hook in each). Alternatively, and depending on the orientation of the bracket 300, one of the over-the-door hanging members 400 may be mounted to the bracket 300 by inserting two adjacent ones of the hooks 461-463 of the over-the-door hanging member 400 into the second slot 311 and the second nesting section 316 of the aperture 313, respectively (one hook in each). Typically either the first slot 310 and the first nesting section 315 or the second slot 311 and the second nesting section 316 is used for mounting the over-the-door hanging member 400 to any one of the bracket 300 at a given time, but not both.

As noted above, the brackets 300 also include the mounting portion 345 extending from the body portion 340. The mounting portion 345 of the brackets 300 is configured to couple the brackets 300 to the frame apparatus 200. In this embodiment, the mounting portion 345 is configured for mounting the brackets 300 directly to the frame 209. More specifically, the mounting portion 345 is configured for interacting with a groove in the inner surface 203 of the frame 209 to mount the bracket 300 directly to the frame 300. Alternatively, the mounting portion 345 could be configured for being mounted directly to the rear surface 202 of the frame 209 using hardware such as screws and/or nails. In the exemplified embodiment, the mounting portion 345 comprises a vertical wall 346 extending downwardly from each of the first and second edge portions 330, 331 of the peripheral edge 303 of the body portion 340 in a direction away from the rear surface 302 of the body portion 340 and a horizontal wall 347 extending from the vertical wall 346 to a terminal edge 348. The horizontal wall 347 extends from the vertical wall 346 in a direction away from the first and second edge portions 330, 331. Thus, the mounting portion 345 has a generally L-shaped structure formed by the vertical wall 346 and the horizontal wall 347. The horizontal wall 347 is recessed relative to the first surface 301 of the body portion 340 of the bracket 300.

The horizontal wall 347 comprises a front surface 349 and an opposite rear surface 359. Furthermore, a plurality of ribs 306 protrude from the first surface 349 of the horizontal wall 347 of the mounting portion 345 of the bracket 300. The exact structure and configuration of the ribs 306 is not to be limited to the embodiment shown, but rather the embodiment illustrated is exemplary in nature. Specifically, in the exemplified embodiment each of the ribs 306 is oriented at an oblique angle relative to the first and second edge portions 330, 331, but the ribs 306 may be otherwise positioned or configured in other embodiments. The ribs 306 assist in securely coupling the brackets 300 to the frame apparatus 200 as will be described in more detail below with reference to FIG. 5B. Although a plurality of discrete and spaced apart ribs 306 are illustrated in the exemplified embodiment, a single rib may be used in other embodiments. Furthermore, in certain embodiments the ribs 306 may be optional and thus the bracket 300 may omit the ribs 306 in some embodiments.

In the exemplified embodiment, two identical brackets 300 are used to couple the over-the-door hanging members 400 to the frame apparatus 200. Specifically, referring to FIG. 1B, two of the brackets 300 are illustrated coupled to the frame apparatus 200. These brackets 300 are identical, except the bracket 300 on the right is rotated 90° in a clockwise direction relative to the bracket 300 on the left. Due to the locations of the slots 310, 311 and the nesting sections 315, 316 of the aperture 313, it is possible to couple the over-the-door hanging members 400 to the brackets 300 in these different rotational positions. The brackets 300 could also be coupled to the frame apparatus 200 on the lower two corners, the two corners on the left, or the two corners on the right (the "left" and "right" being based on the view shown in FIG. 1B) while still enabling the over-the-door hanging members 400 to be coupled to the brackets 300 as described herein.

Although the invention has been described briefly above with regard to mounting the over-the-door hanging members 400 to the brackets 300, the invention is not to be so limited in all embodiments. In other embodiments, the apertures 313 and/or the slots 310, 311 may be used to mount the bracket 300 to a screw, anchor, or other hardware that is already secured to a wall or other surface. In that regard, the entry section 314 of the aperture 313 is preferably sufficiently large in diameter to permit the head of a screw to fit therethrough. The bracket 313 can then be slid onto the screw with the body of the screw fitting within one of the nesting sections 315, 316 of the aperture 313 depending on the orientation of the bracket 300. This technique for hanging articles from a wall using a screw is well known. Thus, the aperture 313 and the slots 310, 311 enables the hanging apparatus 100 to be hung from a wall or other surface using different techniques including screws, anchors, or other wall hardware or using the over-the-door hanging members 400 to secure the hanging apparatus 100 in an over-the-door type fashion.

Figure 4E:
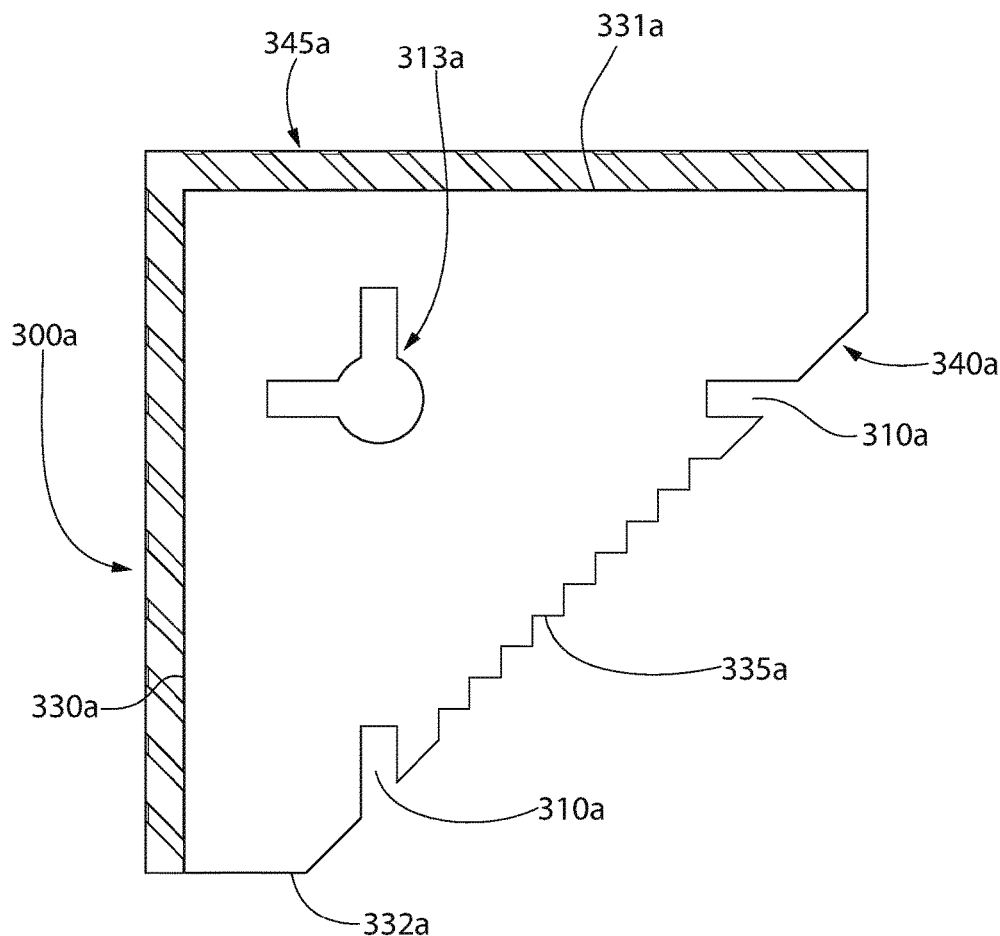
FIG. 4E is a front view of a bracket of the hanging apparatus of FIG. 1A in accordance with an alternative embodiment of the present invention.

Referring briefly to FIG. 4E, a slightly alternative embodiment of a bracket 300a is illustrated. Features of the bracket 300a that are identical to the bracket 300 will be described herein with the suffix "a" following the reference number. Thus, it should be appreciated that for features of the bracket 300a that are numbered but not described or that are not numbered or described, the description of the similar feature on the bracket 300 is applicable.

In this embodiment, the bracket 300a is identical to the bracket 300 except that a section of the third edge portion 332a (and more specifically the third linear section 335a of the third edge portion 332a) comprises a sawtooth configuration. More specifically, in this embodiment a section of the third linear section 335a of the third edge portion 332a that extends between the first and second slots 310a, 310b comprises the sawtooth configuration. The sawtooth configuration is formed by a jagged region of the third linear section 335a. The inclusion of the sawtooth portion permits the bracket 300a to be mounted to a screw or other hardware that is secured on a wall or other surface. Specifically, rather than using the over-the-door hanging members 400 and rather than using the slots 310a, 311a and the aperture 313a for hanging the frame apparatus 200 from a support surface, it can be achieved via interaction between an article of hardware and the sawtooth section of the bracket 300a. The use of sawtooth hangers is known in the industry, and thus a more detailed description of the use of the sawtooth configuration on the third linear section 335a of the bracket 300a will not be provided herein. Any of the brackets described herein may include or not include the sawtooth configuration illustrated and described herein with reference to FIG. 4E.

Figure 5A:
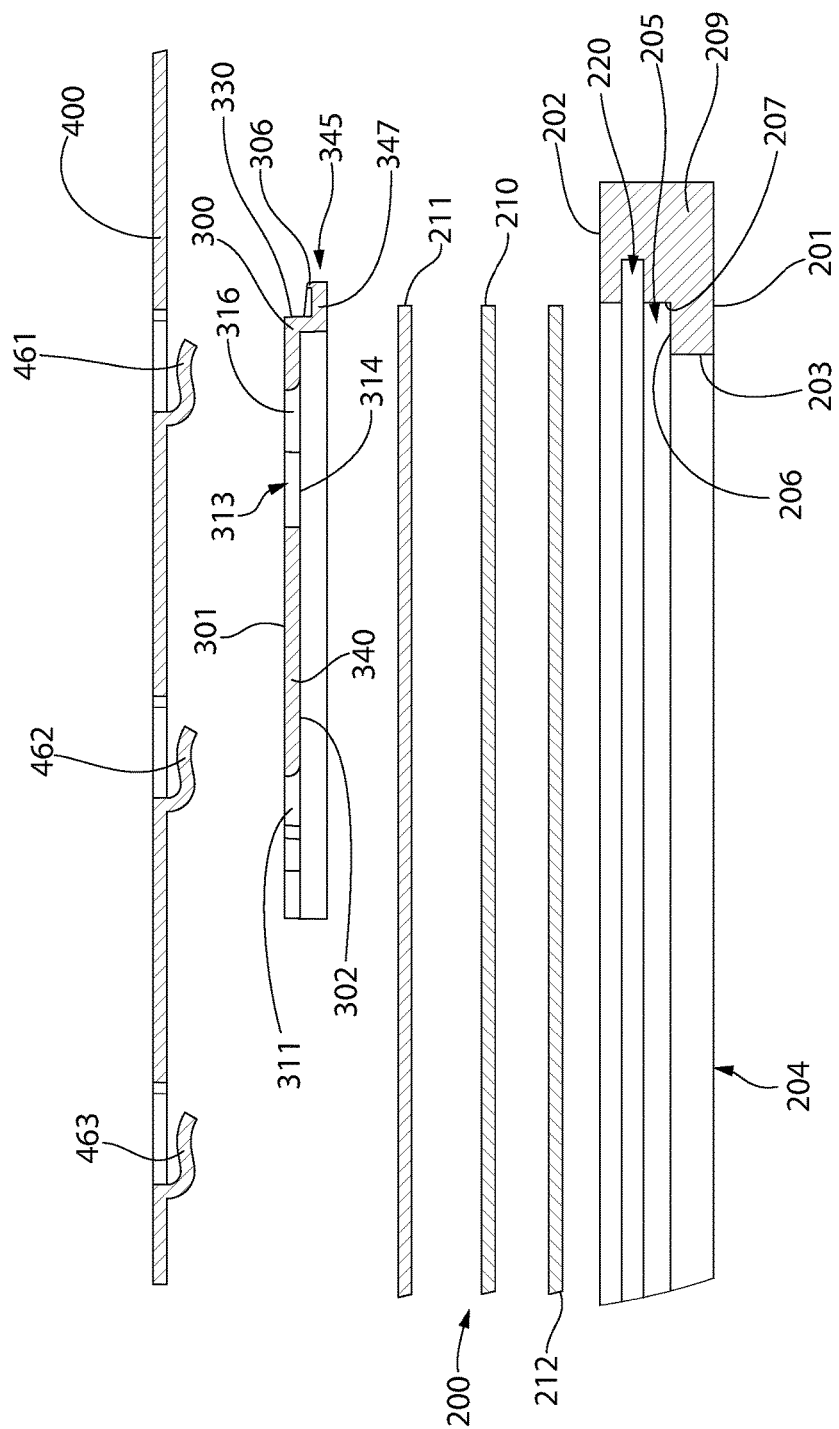
FIG. 5A is an exploded cross-sectional view of the hanging apparatus taken along line VB-VB of FIG. 1B.
Figure 5B:
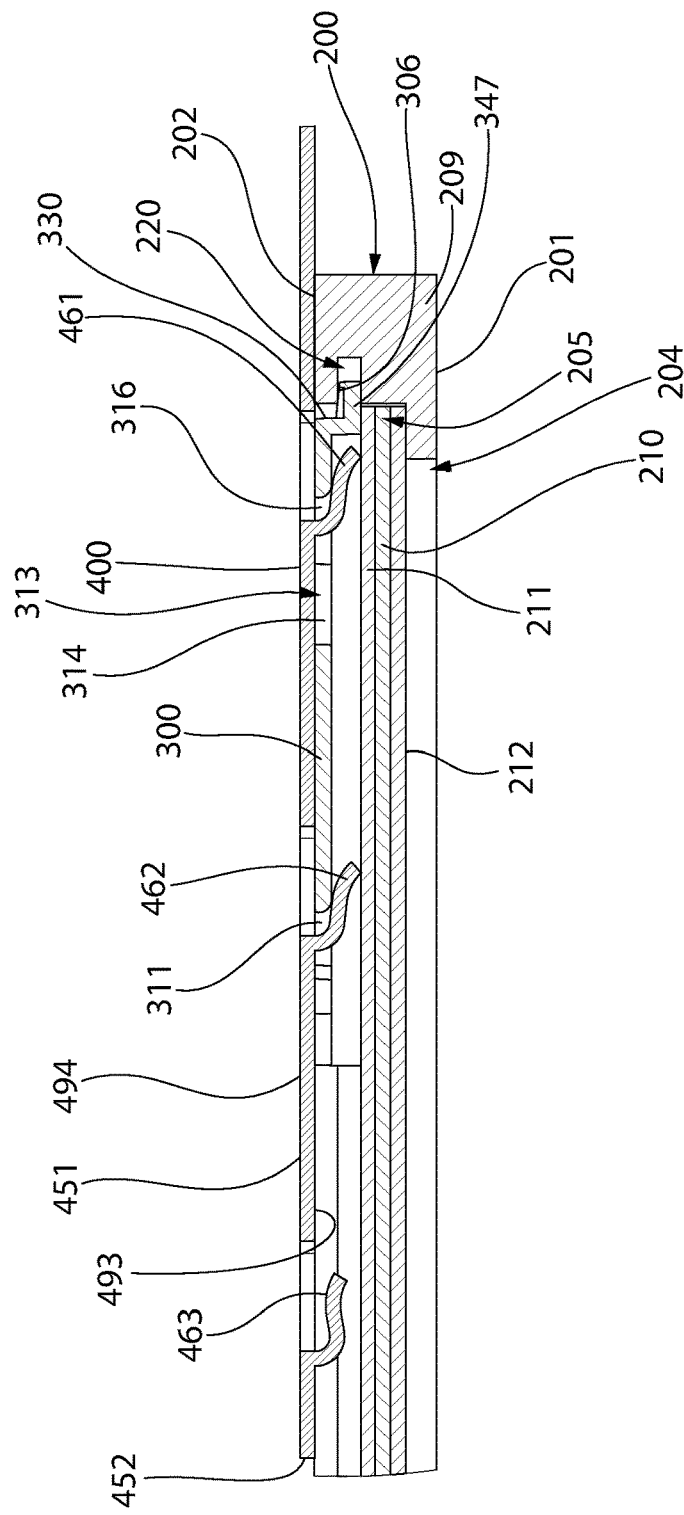
FIG. 5B is a cross-sectional view of the hanging apparatus taken along line VB-VB of FIG. 1B.

Referring to FIG. 5A, the hanging apparatus 100 will be further described with reference to an exploded cross-sectional view. As noted above, the frame 209 of the frame apparatus 200 has a front surface 201, a rear surface 202, and an inner surface 203 that defines the display opening 204. Furthermore, the frame 209 has a rabbet 205 within which the display item 210, the backer panel 211, and the glazing 212 is positioned in the fully assembled frame apparatus 200. The rabbet 205 is defined by a horizontal surface 206 and a vertical surface 207 of the inner surface 203 of the frame 209. The horizontal surface 206 forms a floor of the rabbet 205 upon which the glazing 212 rests when the frame apparatus 200 is assembled as described herein.

As noted above, the display item 210 may be a mirror, and in such embodiments there may be the mirror and the backer panel 211 inserted into the rabbet 205 without also including the glazing 212. In other embodiments the display item 210 may be artwork, and the glazing 212 and the backer panel 211 may be positioned within the rabbet 205 on opposite sides of the artwork. In the exemplified embodiment, the display item 210, the backer panel 211, and the glazing 212 are illustrated, but more or less components may be included (including a filler panel or the like) depending on the type of display item 210 that is secured within the frame 209.

The frame 209 also includes a channel or groove 220 formed into the inner surface 203 at a position that is between where the backer panel 211 lies when the frame apparatus 200 is assembled and the rear surface 202 of the frame 209. In the exemplified embodiment the channel 220 is an annular channel that extends along the entirety of the inner surface 203 of the frame 209. However, the invention is not to be so limited in all embodiments and the channel 220 could be a discontinuous channel extending along portions of the inner surface 203 of the frame 209 where the brackets 300 are more likely to be coupled to the frame 209. For example, the channel 220 may extend only along the corners of the frame 209 where the brackets 300 are coupled to the frame 209 in FIG. 1B.

The rabbet 205 is intended to provide a location for the display item 210, the backer panel 211, and the glazing 212 to nest in the assembled frame apparatus 200. Similarly, the channel 220 provides a location at which the bracket 300 may be coupled to the frame apparatus 200. Specifically, referring concurrently to FIG. 5A and FIG. 5B (which illustrates the same cross-sectional view but with the hanging apparatus 100 fully assembled), to assemble the hanging apparatus 100 first the glazing 212, the display item 210, and the backer panel 211 are inserted into the rabbet 205 of the frame 209 in that order to form the frame apparatus 200. Next, the bracket 300 is coupled to the frame apparatus 200 by inserting the horizontal wall 347 of the mounting portion 345 of the bracket 300 into the channel 220. The horizontal wall 347 of the mounting portion 345 of the bracket 300 may be press fit or wedged into the channel 220 of the frame 209 to couple the bracket 300 to the frame apparatus 200. The ribs 306 on the horizontal wall 347 of the mounting portion 345 of the bracket 300 assist in ensuring that the bracket 300 is securely coupled to the frame apparatus 200 within the channel 200 of the frame 209. Specifically, the ribs 306 prevent the bracket 300 from becoming readily dislodged from the channel 220 by ensuring a secure, tight fit between the mounting portion 345 of the bracket 300 and the channel 220 of the frame 209.

Finally, a determination is made regarding the manner in which the frame apparatus 200 is going to be hung. In the exemplified embodiment, the over-the-door hanging members 400 are used. Thus, in the exemplified embodiment the next step is to insert the first hook 461 of the over-the-door hanging member 400 into the aperture 313 of the bracket 300 while simultaneously inserting the second hook 462 of the over-the-door hanging member 400 into the second slot 311 of the bracket 300. Rather than the first and second hooks 461, 462, in other embodiments the second and third hooks 462, 463 may be used. Furthermore, depending on the orientation of the bracket 300 and the frame apparatus 200, the one of the hooks may be inserted into the first slot 310 rather than the second slot 311. Regardless, this action secures the over-the-door hanging members 400 to the bracket 300. The over-the-door hanging members 400 may then be hung from over the top of a door as illustrated in FIG. 17.

Alternatively, the over-the-door hanging members 400 may not be used in other embodiments. Rather, in another embodiment a screw, anchor, or other wall hardware may be used and may be secured to the bracket 300 by inserting it into the aperture 313 in a traditional manner, or by securing such a screw to a sawtooth edge of the bracket 300 as described above. Thus, the brackets 300 are designed to permit the utilization of several different mounting techniques for mounting the frame apparatus 200, or the hanging apparatus 100, to a wall, door, other vertical surface, or the like.

Figure 6:
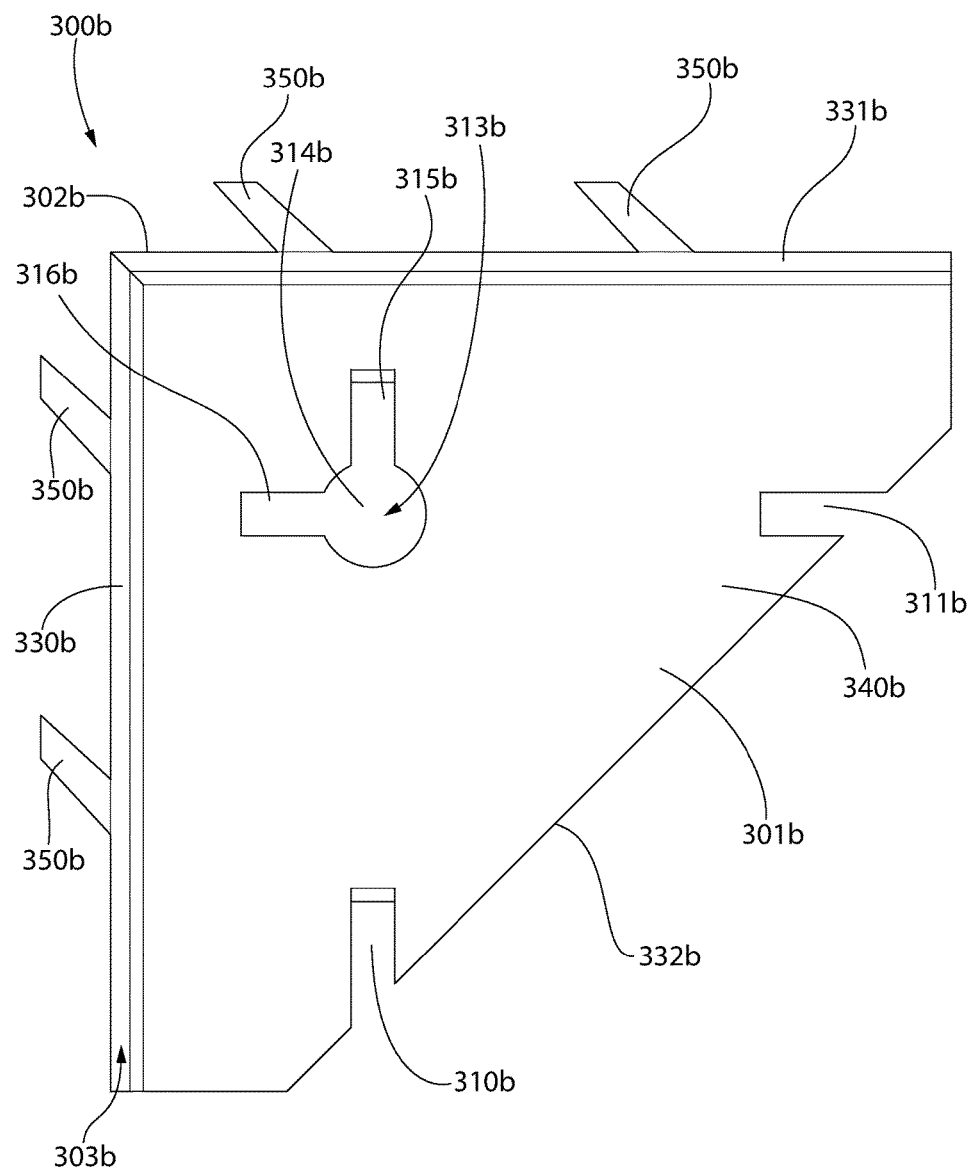
FIG. 6 is a front view of a bracket of the hanging apparatus of FIG. 1A in accordance with another embodiment of the present invention.

Referring to FIG. 6, another alternative embodiment of a bracket 300b is illustrated. The bracket 300b is identical to the bracket 300 described above with reference to FIGS. 4A-4D except for the differences described herein below. Thus, the bracket 300b will be similarly numbered to the bracket 300 except that the suffix "b" will be used. For features of the bracket 300b that are not described in detail herein, it should be appreciated that the description of the bracket 300 above applies. Furthermore, for features of the bracket 300b that are numbered but not described, it should be appreciated that the description of the similarly numbered feature of the bracket 300 is applicable.

The bracket 300b is identical to the bracket 300 with regard to the structure of the slots 310b, 311b and the aperture 313b. However, the bracket 300b does not include the vertical and horizontal walls 346, 347 of the mounting section 345 as described above. Specifically, in this embodiment the mounting section 345 is omitted and instead the bracket 300b includes projections or barbs 350b protruding from the peripheral edge 303b of the body portion 340b of the bracket 300b. Specifically, in the exemplified embodiment there are two projections 350b protruding from the first edge portion 330b of the peripheral edge 303b and two projections 350b protruding from the second edge portion 331b of the peripheral edge 303b. In the exemplified embodiment, the projections 350b protrude from the peripheral edge 303b in a direction that is substantially parallel to a plane on which the front and rear surfaces 301b, 302b of the bracket 300b lie. The projections 350b may be barbs or other sharp projections capable of piercing the inner surface 203 of the frame 209 to secure the bracket 300b to the frame 209.

Figure 7:
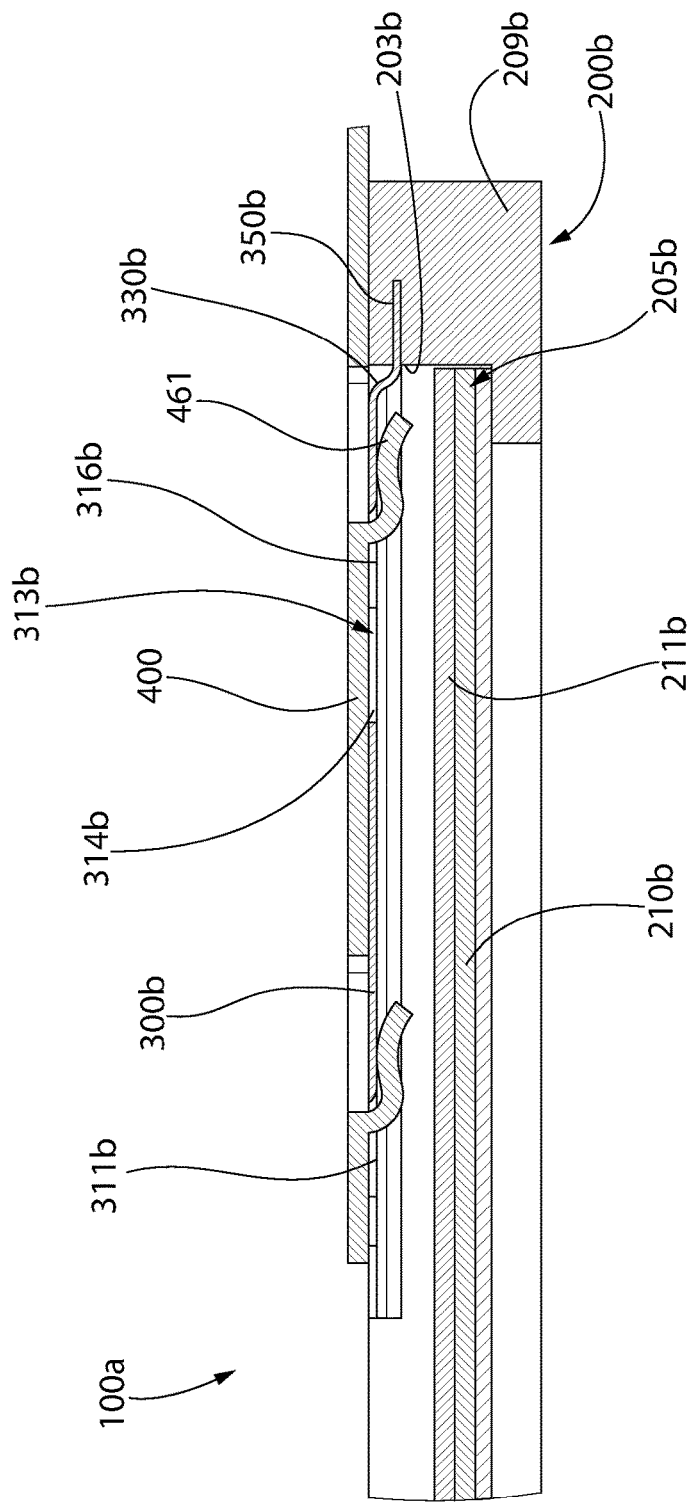
FIG. 7 is a cross-sectional view of the hanging apparatus taken along line VB-VB of FIG. 1B utilizing the bracket of FIG. 6.
Figure 8:
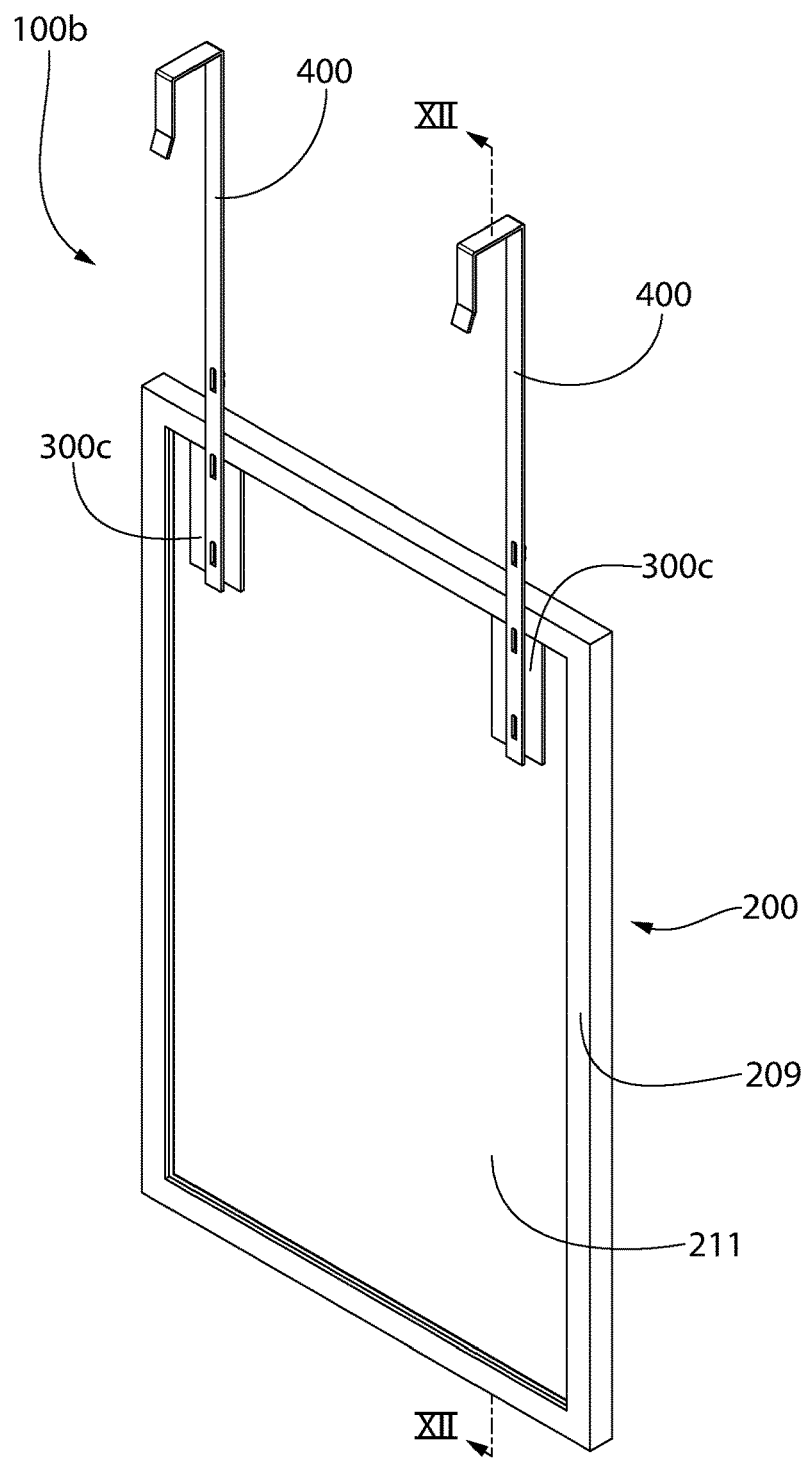
FIG. 8 is a rear perspective view of a hanging apparatus in accordance with another embodiment of the present invention.
Figure 9:
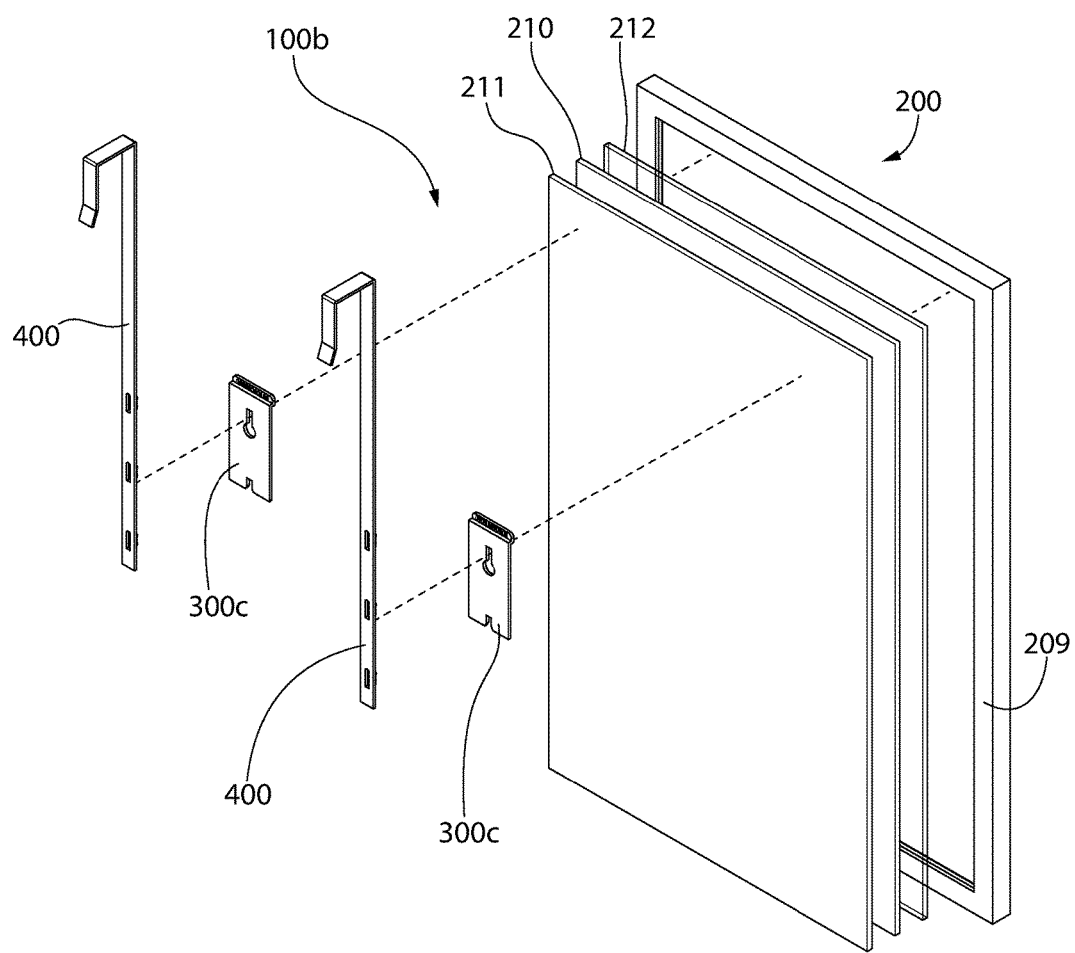
FIG. 9 is an exploded rear perspective view of the hanging apparatus of FIG. 8 illustrating a frame apparatus, two brackets, and two over-the-door hanging members.

Referring to FIG. 7, a cross-sectional view of an alternative assembled hanging apparatus 100a is illustrated when using the bracket 300b rather than the bracket 300. In this embodiment, the frame 209b includes the rabbet 205b, but does not include a channel. This is because the projections 350 are configured to pierce or penetrate the inner surface 203a of the frame 209a. In that regard, the bracket 300b may be coupled to the frame apparatus 200a using techniques similar to how the industry currently couples flex tabs to frames. The bracket 300b may then be coupled to the over-the-door hanging members 400 or to a screw or other hardware as described herein above with regard to the bracket 300 to hang the hanging apparatus 100a from a support surface.

Referring to FIGS. 8-12, a hanging apparatus 100b will be described in accordance with still another embodiment. In this embodiment, the hanging apparatus 100b includes the frame apparatus 200 (already described above), the over-the-door hanging members 400 (already described above), and brackets 300c. The frame apparatus 200 is the same frame apparatus 200 as has been described above and thus the same numerals are used for the features of the frame apparatus 200. Similarly, the over-the-door hanging members 400 are the same over-the-door hanging members 400 as have been described above, and thus the same numerals are used for the features of this component. The details of the frame apparatus 200 and the over-the-door hanging members 400 will not be provided again in the interest of brevity. The brackets 300c are different in structure/shape than the previously described brackets 300, 300a, 300b. Thus, the brackets 300c are described herein using the suffix "c," although it should be appreciated that similarly numbered features have a similar structure and/or function to that described above and thus the description of the brackets 300, 300a, 300b may be applicable to the brackets 300c. The focus of the description of FIGS. 8-11 will be on the brackets 300c, it being understood that the description above is applicable for the other components.

The frame apparatus 200 includes the frame 209, the backer panel 211, and the glazing 212 as previously described. The backer panel 211 and the glazing 212 (and the display item 210) are disposed within the rabbet of the frame 209 to form the frame apparatus 200 and then the brackets 300c are coupled to the frame apparatus 200. The over-the-door hanging members 400 can then be mounted to the brackets 300c as will be described more thoroughly below. The mounting of the over-the-door hanging members 400 to the brackets 300c is similar to the mounting of the over-the-door hanging members 400 to the brackets 300, 300a, 300b.

Figure 10:
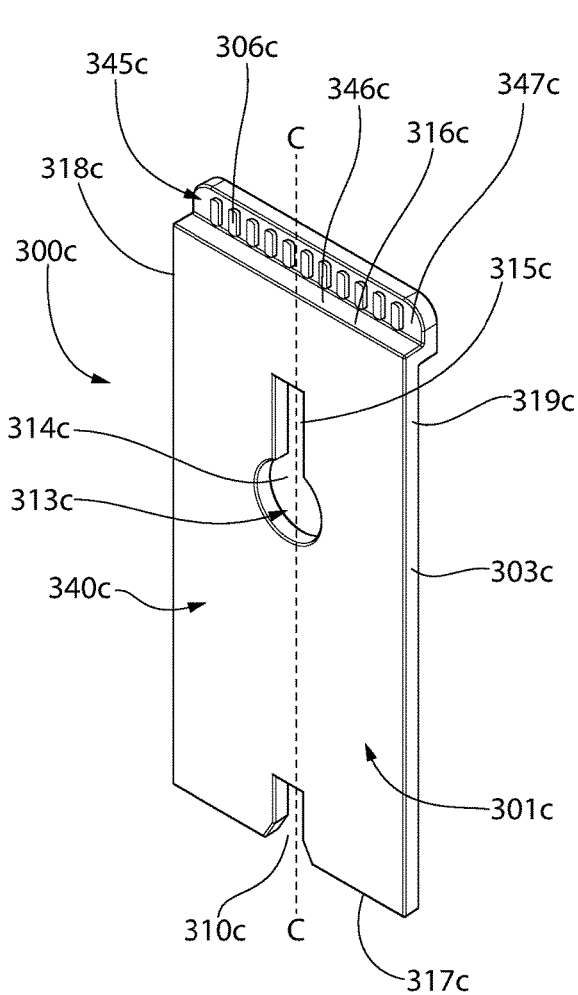
FIG. 10 is a front perspective view of the brackets of the hanging apparatus of FIG. 8.
Figure 11:
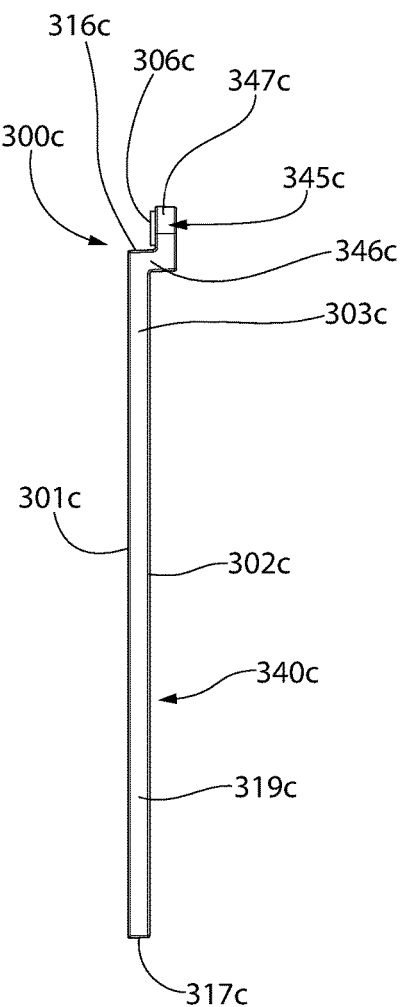
FIG. 11 is a side view of the bracket of FIG. 10.

Referring to FIGS. 10 and 11, the bracket 300c comprises a body portion 340c and a mounting portion 345c extending from the body portion 340c. The body portion 340c comprises a first surface 301c, a second surface 302c, and a peripheral edge 303c extending between the first and second surfaces 301c, 302c. In this embodiment, the bracket 300c is rectangular or square shaped rather than being triangular shaped. Thus, in this embodiment the peripheral edge 303c of the body portion 340c of the bracket 300c comprises a top edge 316c, a bottom edge 317c, and first and second side edges 318c, 319c. The body portion 340c of the bracket 300c comprises a slot 310c extending from the bottom edge 317c towards the top edge 316c and an aperture 313c extending through the bracket 300c from the first surface 301c to the second surface 302c. The aperture 313c comprises an entry section 314c and a nesting section 315c extending from the entry section 314c. The slot 310c and the nesting section 315c are aligned along an axis C-C, which is parallel to each of the first and second side edges 318c, 319c. More specifically, in the exemplified embodiment the slot 310c and the nesting section 315c of the aperture 313c are elongated along the axis C-C. Thus, the elongate elements 400 can be coupled to the bracket 300 by inserting one of the hooks 461-463 into the slot 310c and another one of the hooks 461-463 into the nesting section 315c of the aperture 313c in a similar manner to the coupling of the over-the-door hanging members 400 to the bracket 300 as described above. Alternatively, the aperture 313c (and/or the slot 310c) may be used to couple or mount the bracket 300 onto a screw or other hardware that is pre-secured onto a wall or other surface. The bottom edge 317c may also include a sawtooth configuration to provide an additional location on the bracket 300c that may be mounted onto hardware protruding from a support surface such as a wall or a door.

The mounting section 345c of the bracket 300c includes a vertical wall 346c extending from the top edge 316c of the body portion 340c of the bracket 300c and a horizontal wall 347c extending from the vertical wall 346c in a direction away from the top edge 316c. The horizontal wall 347c may include ribs 306c protruding therefrom to facilitate securely mounting the bracket 300c to the frame 209 as has been described above with regard to the bracket 300.

Figure 12:
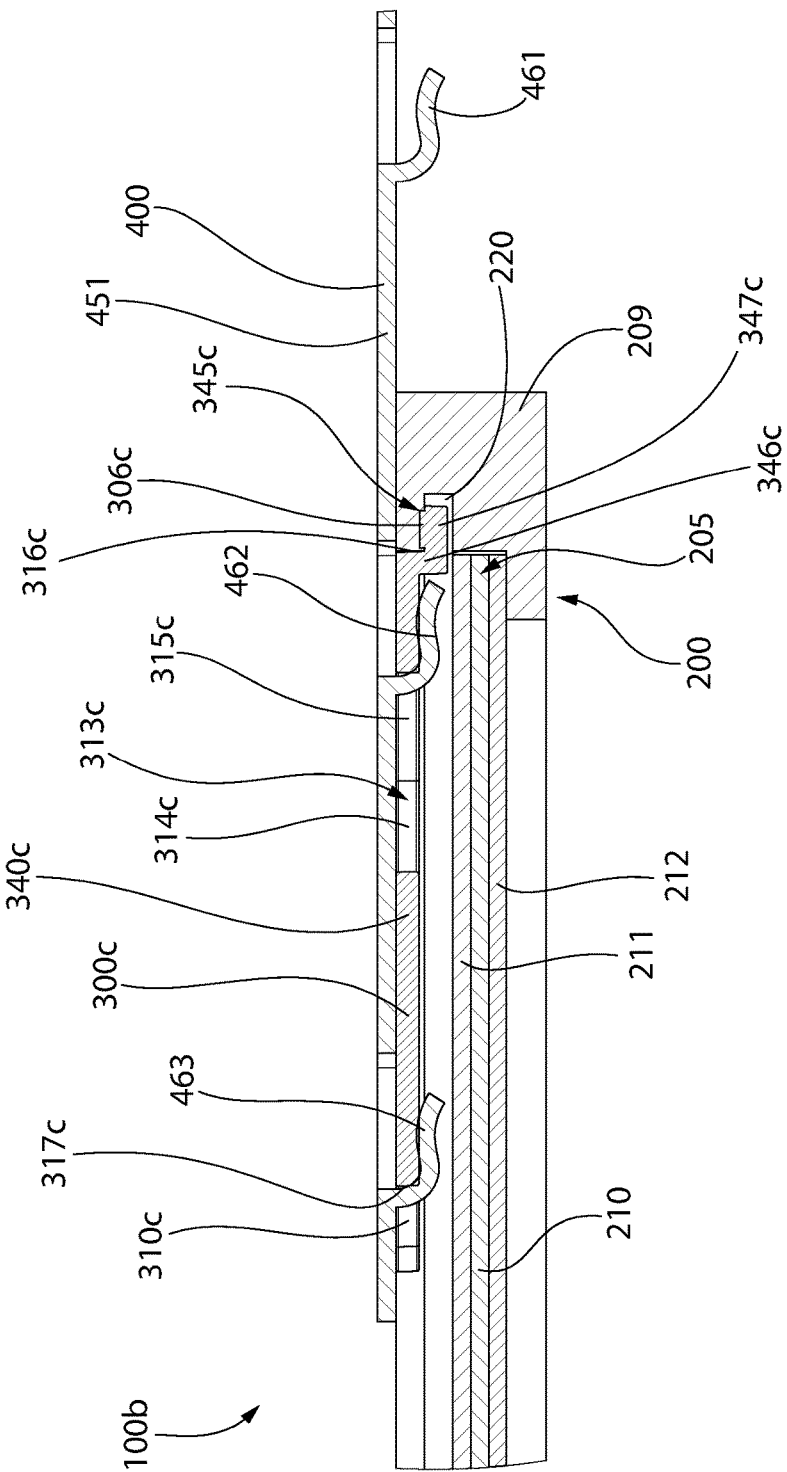
FIG. 12 is a cross-sectional view taken along line XII-XII of FIG. 8.

Referring to FIG. 12, a cross-sectional assembled view of the hanging apparatus 100b is illustrated. The mounting section 345c of the bracket 300c is inserted into the channel 220 of the frame apparatus 200 to couple the bracket 300c to the frame apparatus 200, and more specifically to the frame 209 of the frame apparatus 200. This can be accomplished via press-fitting or otherwise. The over-the-door hanging member 400 is then mounted to the bracket 300c in the manner described above. When the over-the-door hanging member 400 is mounted to the bracket 300c, the over-the-door hanging member 400 may then be coupled to a top of a door as illustrated in FIG. 17. Alternatively, the over-the-door hanging member 400 may not be used and the bracket 300 may be coupled directly to a screw or other hardware as described herein.

Referring to FIGS. 13-16C, a hanging apparatus 100c will be described in accordance with still another embodiment of the present invention. In this embodiment, the hanging apparatus 100c includes the frame apparatus 200 (already described above), the over-the-door hanging members 400 (already described above), and brackets 300d. The frame apparatus 200 is the same frame apparatus 200 as has been described above and thus the same numerals are used for the features of the frame apparatus 200. Similarly, the over-the-door hanging members 400 are the same over-the-door hanging members 400 as have been described above, and thus the same numerals are used for the features of this component. The details of the frame apparatus 200 and the over-the-door hanging members 400 will not be provided again in the interest of brevity. The brackets 300d are similar to the brackets 300, 300a described above except that the structure of the mounting portion 345d of the bracket 300d is different than the mounting portion 345 of the brackets 300. Thus, the brackets 300d are described herein using the suffix "d" and it should be appreciated that for features of the brackets 300d that are numbered but not described (or not numbered or described), the description of the brackets 300 above is applicable The frame apparatus 200 includes the frame 209, the backer panel 211, and the glazing 212 as previously described. The backer panel 211 and the glazing 212 (and the display item 210) are disposed within the rabbet 205 of the frame 209 to form the frame apparatus 200. As discussed in more detail below, in this embodiment the brackets 300d are coupled to the backer panel 211 before the backer panel 211 is placed within the rabbet 205 of the frame 209. Specifically, in this embodiment the mounting portion 345d of the brackets 300d are configured to wrap around a portion of the backer panel 211 to mount the brackets 300d to the backer panel 211 before the backer panel 211 is placed within the rabbet 205 of the frame 209. The over-the-door hanging members 400 can then be mounted to the brackets 300d. The mounting of the over-the-door hanging members 400 to the brackets 300d is similar to the mounting of the over-the-door hanging members 400 to the brackets 300, 300a, 300b, 300c.

Figure 13:
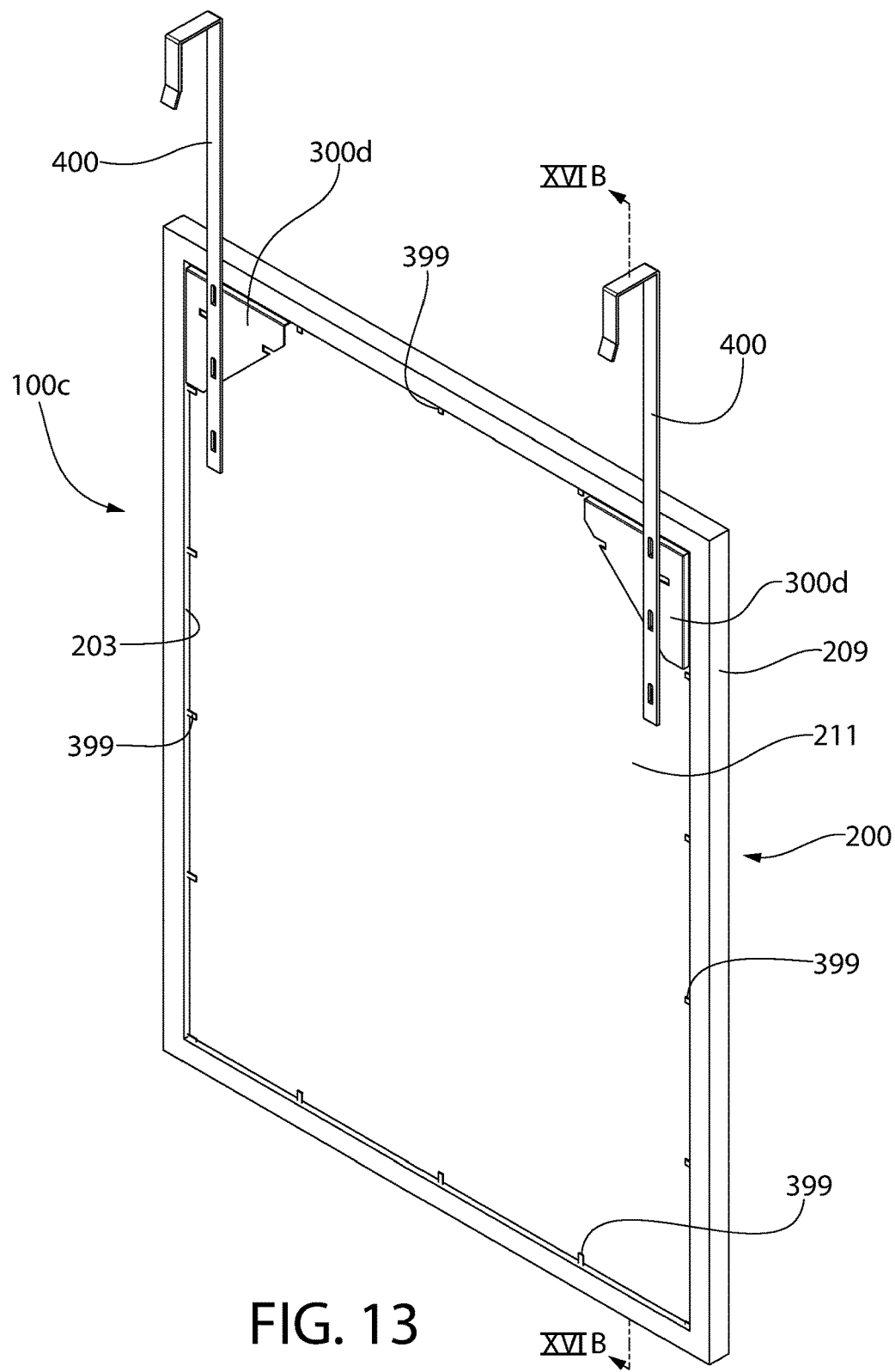
FIG. 13 is a rear perspective view of a hanging apparatus in accordance with another embodiment of the present invention.
Figure 14A:
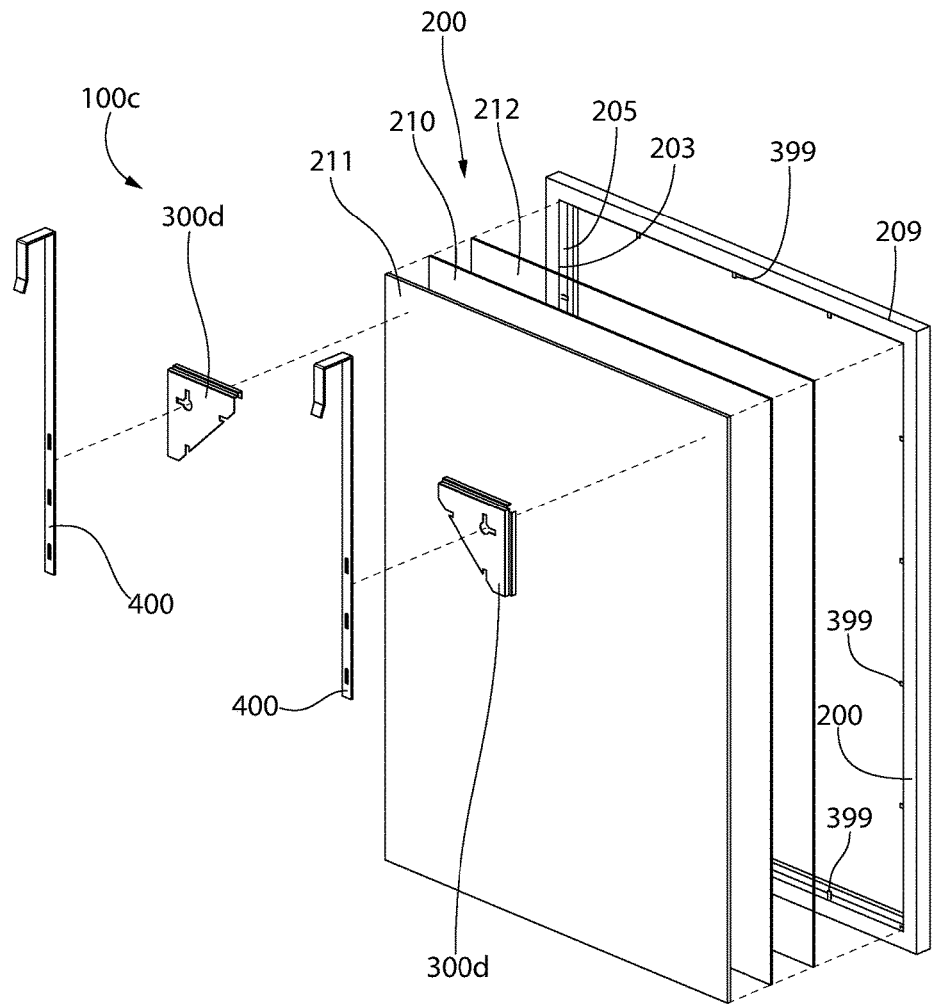
FIG. 14A is an exploded rear perspective view of the hanging apparatus of FIG. 13 illustrating a frame apparatus, a glazing, a backer panel, two brackets, and two over-the-door hanging members.

As seen in FIGS. 13 and 14A, in this embodiment the frame apparatus 200 includes a plurality of flex tabs 399 for retaining the stack (i.e., the backer panel 211 and the glazing 212) and the display item 210 within the rabbet 205 of the frame 209. The flex tabs 399 are coupled to the frame 209 such that a portion of the flex tabs 399 is embedded within the inner surface 203 frame 209 while another portion of the flex tabs 399 protrude from the inner surface 203 of the frame 209. This technique for coupling the flex tabs 399 to the frame apparatus 200 is well known in the industry. The portion of the flex tabs 399 that protrudes from the inner surface 203 of the frame 209 can be pivoted/rotated relative to the frame 209 to permit insertion of the glazing 212, the display item 210, and the backer panel 211 within the rabbet 205 of the frame 209 and to then secure the glazing 212, the display item 210, and the backer panel 211 within the rabbet 205 of the frame 209. When the glazing 212, the display item 210, and the backer panel 211 are positioned within the rabbet 205 and the flex tabs 399 are made to overlap/lie across the backer panel 211, the backer panel 211, the display item 210, and the glazing 212 are prevented from being readily removed from the rabbet 205. Although the flex tabs 399 are illustrated in the exemplified embodiment, they may be omitted and replaced with turn buttons or other hardware that achieves the same function of maintaining the backer panel 211, the display item 210, and the glazing 212 within the rabbet 205 of the frame apparatus 200.

Figure 14B:
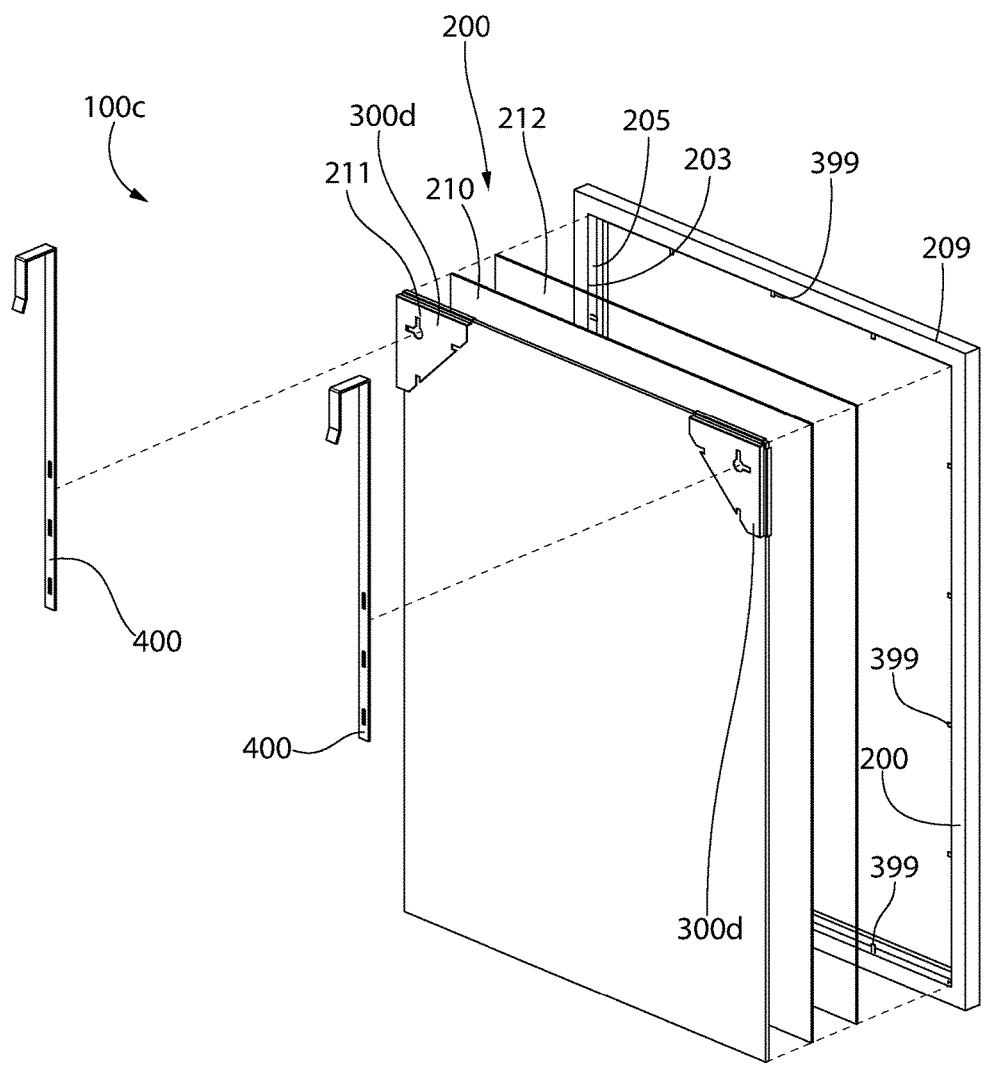
FIG. 14B is an exploded rear perspective view of the hanging apparatus of FIG. 14A with the brackets coupled to the backer panel.
Figure 15A:
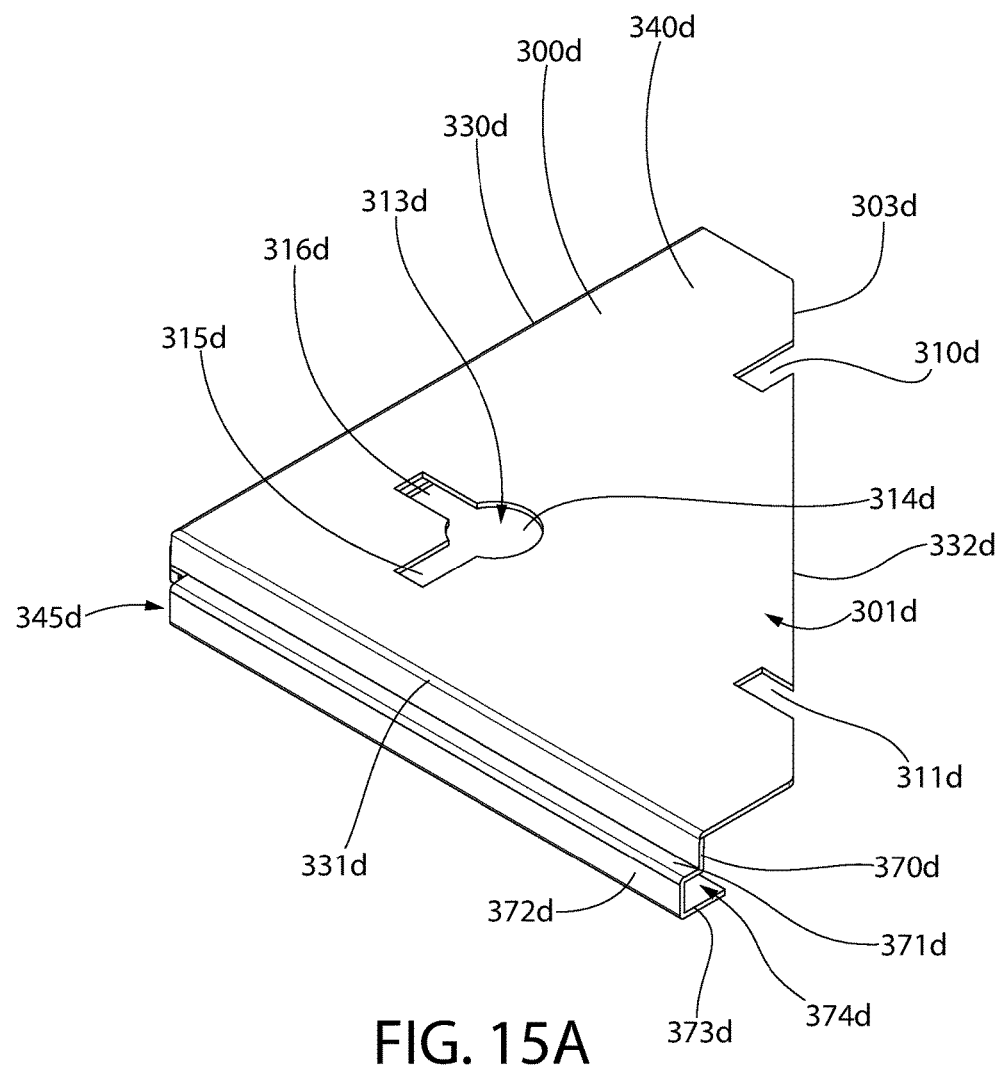
FIG. 15A is a front perspective view of the bracket of the hanging apparatus of FIG. 13.
Figure 15B:
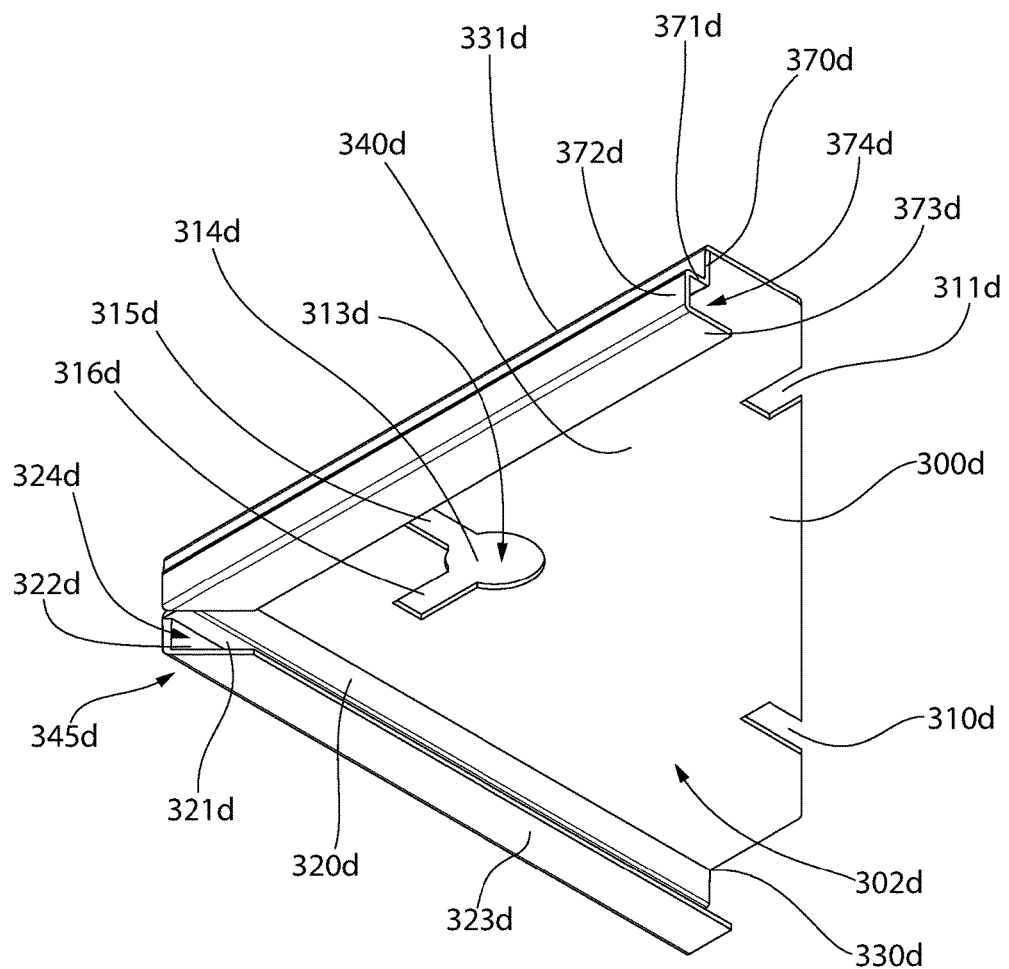
FIG. 15B is a rear perspective view of the bracket of FIG. 15A.
Figure 15C:
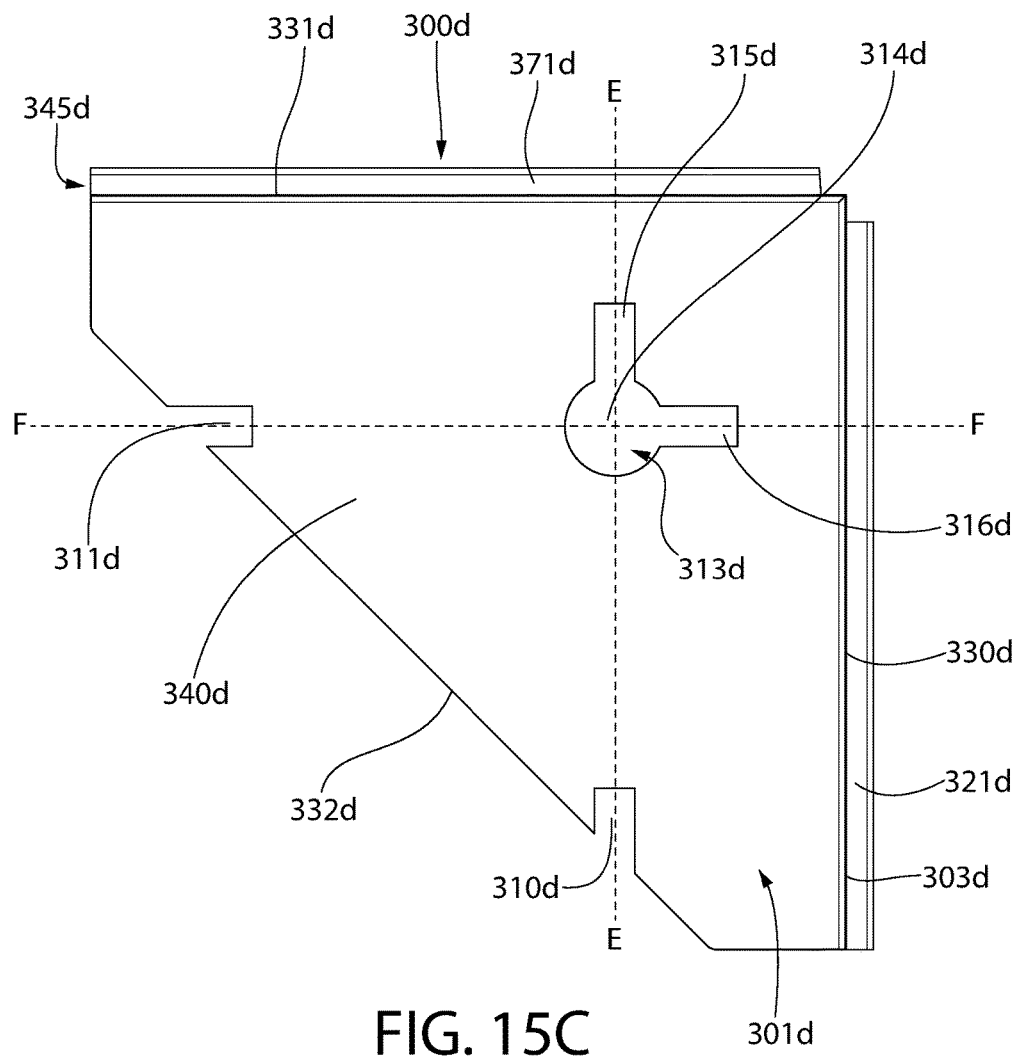
FIG. 15C is a front view of the bracket of FIG. 15A.
Figure 15D:
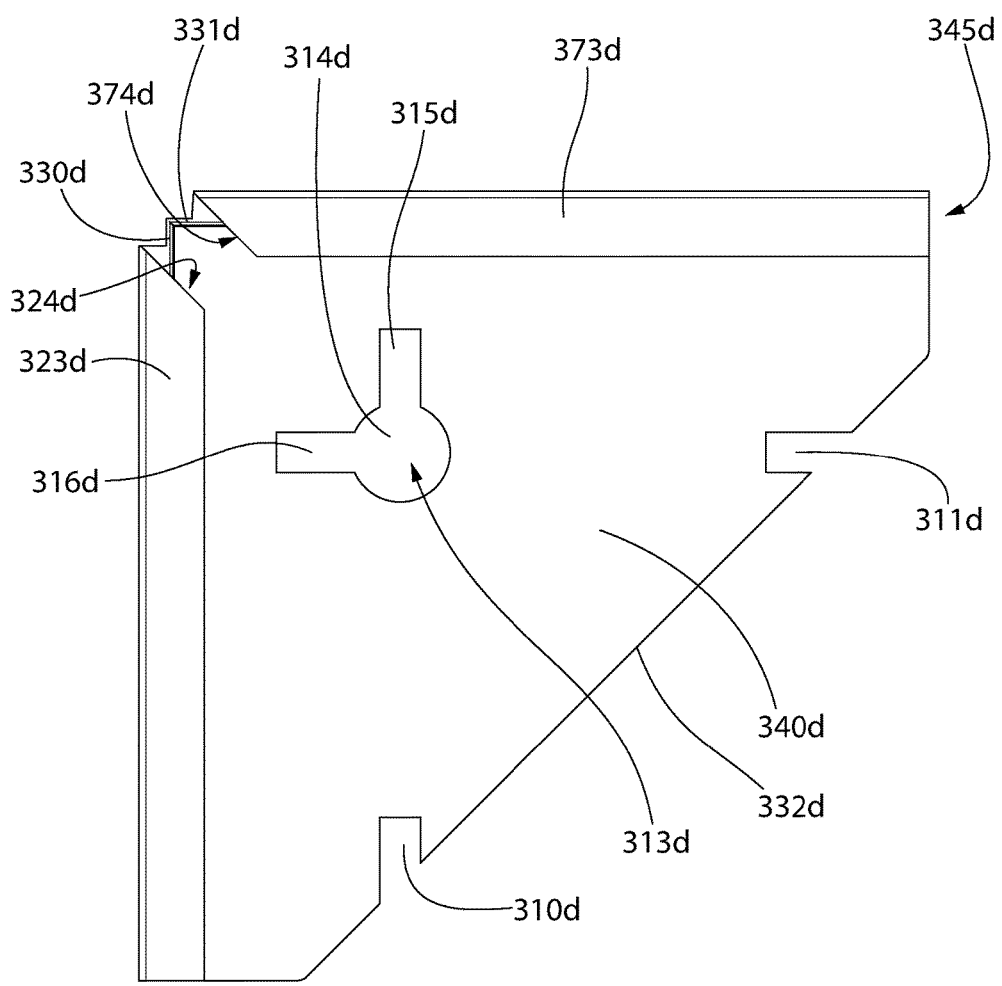
FIG. 15D is a rear view of the bracket of FIG. 15A.

FIG. 14B is identical to FIG. 14A except that the brackets 300d are illustrated coupled to the backer panel 211. As briefly mentioned above, in this embodiment the brackets 300d are coupled to the backer panel 211 before the backer panel 211 is inserted into the rabbet. Thus, FIG. 14B illustrates the arrangement of the components just prior to inserting the glazing 212, the display item 210, and the backer panel 211 into the rabbet 205 of the frame 209. FIG. 14B will be described in greater detail below collectively with FIG. 16B once the structural details of the bracket 300d have been described.

Referring to FIGS. 15A-15D, the brackets 300d will be described. The brackets 300d are generally similar to the brackets 300 described above. In that regard, the brackets 300d include a body portion 340d and a mounting portion 345d extending from the body portion 340d for mounting the brackets 300d to the frame apparatus 200. The structure of the body portion 340d of the bracket 300d is identical to the body portion 340 of the bracket 300, and thus the details will only be briefly repeated herein in the interest of brevity.

Specifically, the body portion 340d comprises a first surface 301d, an opposite second surface 302d, and a peripheral edge 303d extending between the first and second surfaces 301d, 302d. The peripheral edge 303d includes a first edge portion 330d, a second edge portion 331d, and a third edge portion 332d. A first slot 310d extends from the third edge portion 332d towards the second edge portion 331d and a second slot 311d extends from the third edge portion 332d toward the first edge portion 330d. Furthermore, an aperture 313d is formed into the body portion 340d of the bracket 300d at a location that is spaced apart from the first and second slots 310d, 311 d. The aperture 313d comprises an entry section 314d, a first nesting section 315d extending from the entry section 314d towards the second edge portion 331d, and a second nesting section 316d extending form the entry section 314d towards the first edge portion 330d.

The first slot 310d and the first nesting section 315d of the aperture 313d are aligned on and elongated along a first axis E-E that is parallel to the first edge portion 330d of the peripheral edge 303d of the body portion 340d of the bracket 300d. The second slot 311d and the second nesting section 316d of the aperture 313d are aligned on and elongated along a second axis F-F that is parallel to the second edge portion 331d of the peripheral edge 303d of the body portion 340d of the bracket 300d. The first and second axes E-E, F-F are perpendicular to one another. The first and second slots 310d, 311d and the aperture 313d are used for coupling one of the over-the-door hanging members 400 to the bracket 300d or for hanging the bracket 300d from some other hardware (screw, nail, etc.), as described above.

The mounting section 345d of the bracket 300d is different than in the previously described embodiments. In this embodiment, the mounting section 340d of the bracket 300d is configured to wrap around a portion of the backer panel 211 before inserting the backer panel 211 into the rabbet 205 of the frame 209. Specifically, as best seen in FIG. 14B, each of the brackets 300d is configured to wrap around one of the corners of the backer panel 211. The backer panel 211 (along with the display item 210 and the glazing 212) are then inserted into the rabbet 205 and coupled to the frame 209 using the flex tabs 399 or the like as described herein above. Because the mounting section 345d of the bracket 300d wraps around the backer panel 211, when the backer panel 211 is secured to the frame 209, the bracket 300d is also secured to the frame apparatus 200d because a portion of the mounting section 345d of the bracket 300d is trapped between the backer panel 211 and the display item 210 (see FIG. 16C described in more detail below).

The mounting portion 345d comprises a first vertical wall 320d extending downwardly from the first edge portion 330d of the bracket 300d in a direction away from the second surface 302d of the body portion 340d of the bracket 300d, a first horizontal wall 321d extending from the first vertical wall 320d in a direction away from the first edge portion 330d of the peripheral edge 303d of the bracket 300d, a second vertical wall 322d extending downwardly from the first horizontal wall 321d in the direction away from the second surface 302d of the bracket 300d, and a second horizontal wall 323d extending from the second vertical wall 322d in a direction towards the first edge portion 330d of the peripheral edge 303d of the bracket 300d. Furthermore, the mounting portion 345d comprises a first elongated channel 324d that is defined by the first horizontal wall 321d, the second vertical wall 322d, and the second horizontal wall 323d. In the exemplified embodiment, the first and second vertical walls 320d, 322d are parallel to one another and the first and second horizontal walls 321d, 323d are parallel to one another.

Similarly, the mounting portion 345d comprises a third vertical wall 370d extending downwardly from the second edge portion 331d of the peripheral edge 303d of the body portion 340d of the bracket 300d in a direction away from the second surface 302d of the body portion 340d of the bracket 300d, a third horizontal wall 371d extending from the third vertical wall 370d in a direction away from the second edge portion 331d of the peripheral edge 303d of the bracket 300d, a fourth vertical wall 372d extending downwardly from the third horizontal wall 37d, and a fourth horizontal wall 373d extending from the fourth vertical wall 372d in a direction towards the second edge portion 331d of the peripheral edge 303d of the bracket 300d. Furthermore, the mounting portion 345d of the bracket 300d comprises a second elongated channel 374d that is defined by the third horizontal wall 371d, the fourth vertical wall 372d, and the fourth horizontal wall 373d. In the exemplified embodiment, the third and fourth vertical walls 370d, 372d are parallel to one another and the third and fourth horizontal walls 371d, 373d are parallel to one another.

The first elongated channel 324d extends parallel to the first edge portion 330d of the peripheral edge 303d of the body portion 340d of the bracket 300d and the second elongated channel 374d extends parallel to the second edge portion 331d of the peripheral edge 303d of the body portion 340d of the bracket 300d. Each of the first and second elongated channels 324d, 374d is sized and configured to receive a portion of the backer panel 211 therein such that the bracket 300d can be coupled to a corner of the backer panel 211 by inserting portions of two adjacent edges of the backer panel 211 that are joined at the corner into the first and second elongated channels 324d, 374d. The first and second elongated channels 324d, 374d are spaced apart from the second surface 302d of the bracket 300d by the first and second vertical walls 320d, 370d, respectively. Thus, when the bracket 300d is coupled to the backer panel 211 as described more fully herein below, the first and third vertical walls 320d, 370d maintain a space between the first and second elongated channels 324d, 374d of the mounting portion 345d of the bracket 300d and the backer panel 211. This space provides a location for insertion of the hooks 461-463 of the over-the-door hanging members 400 or some other hardware as described herein during hanging of the frame apparatus 100c.

Although not illustrated in the exemplified embodiment, in certain embodiments the third edge portion 332d of the body portion 340d of the bracket 300d may comprises a sawtooth configuration similar to that which is illustrated in FIG. 4E and described above.

Figure 16A:
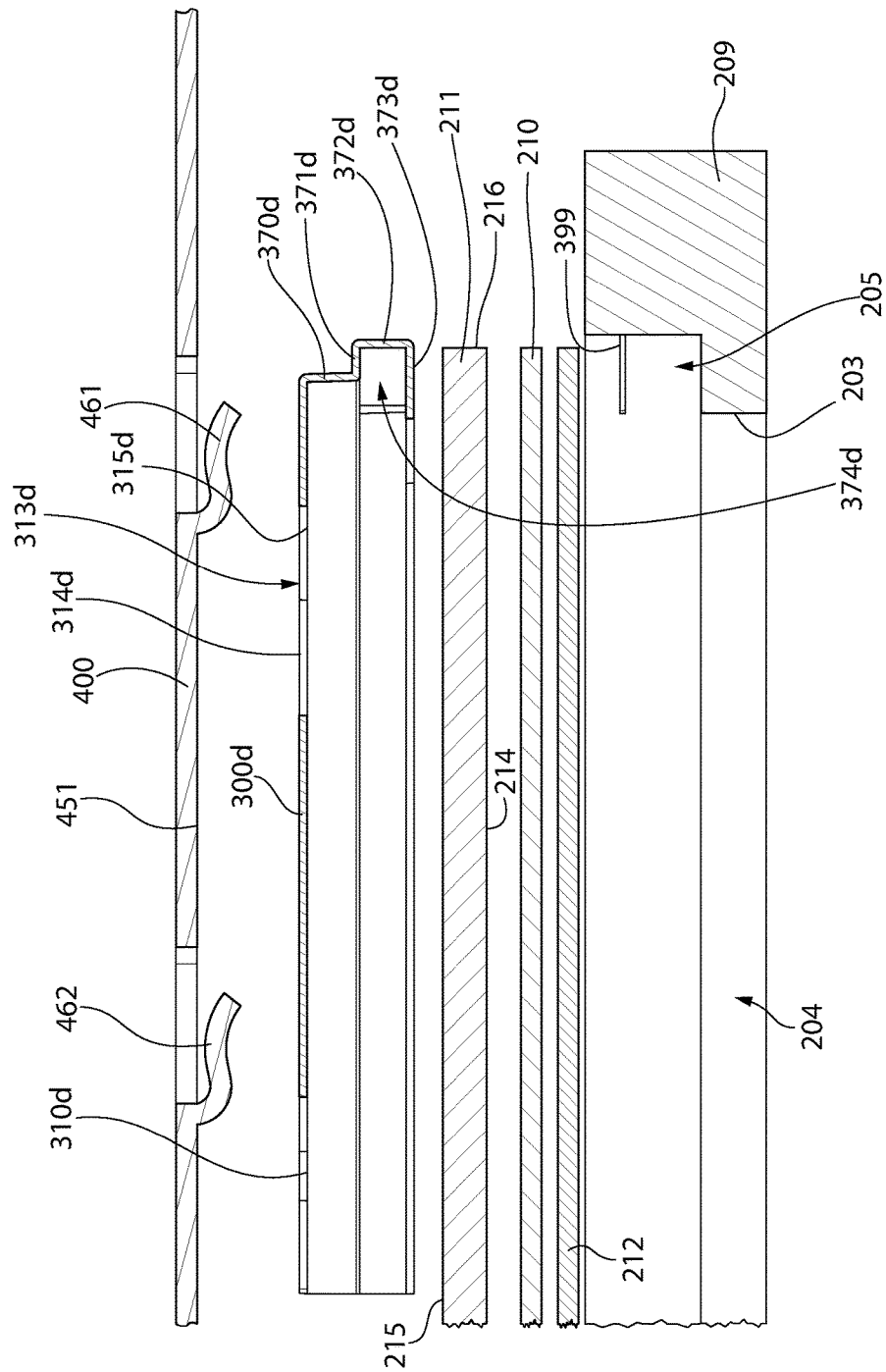
FIG. 16A is a cross-sectional view taken along line XVI-XVI in FIG. 13 with the components exploded.

FIG. 16A schematically illustrates a cross-section of a portion of the hanging apparatus 100c with the components exploded. Thus, in this view the frame 209 is shown with the rabbet 205 empty and ready to receive the glazing 212, the display item 210, and the backer panel 211. Furthermore, the flex tabs 399 are coupled to the frame 209 as described above. The bracket 300d is positioned above the backer panel 211 in preparation for coupling the bracket 300d to the backer panel 211. The over-the-door hanging member 400 is illustrated having two hooks 461, 462, although the over-the-door hanging member 400 may have more than two hooks as described above. Furthermore, the over-the-door hanging member 400 may be omitted in some embodiments as the bracket 300d may be hung from a wall via different hardware as described herein.

Figure 16B:
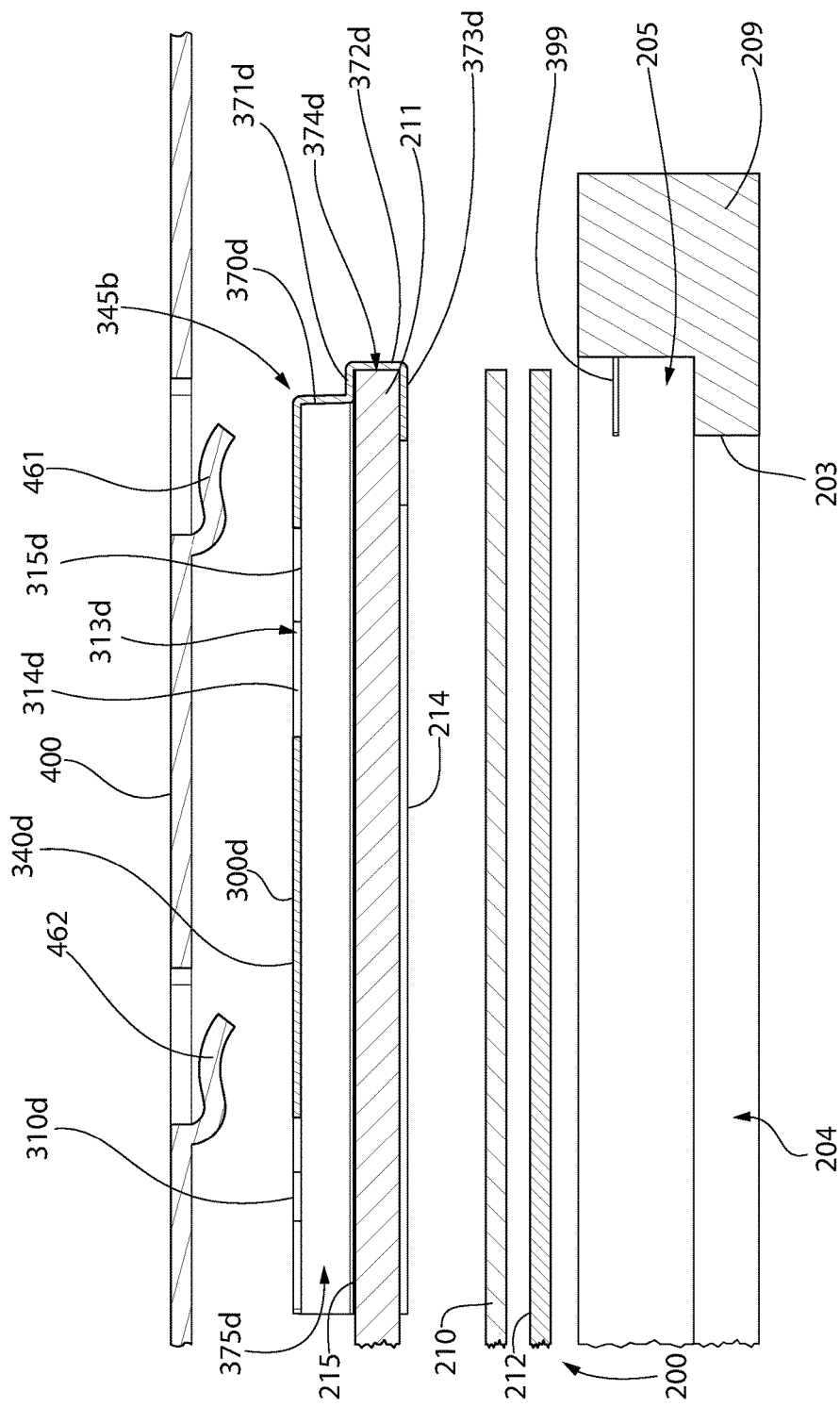
FIG. 16B is the cross-sectional view of FIG. 16A with the bracket coupled to the backer panel.

FIG. 16B illustrates the same thing as FIG. 16A except that the bracket 300d is now coupled to the backer panel 211 as illustrated in FIG. 14B. Specifically, in this embodiment a portion of the backer panel 211 is inserted within the channels 324d, 374d formed by the walls of the mounting portion 345d of the bracket 300. As noted above, the walls of the mounting portion 345d are located at two adjacent edges of the bracket 300, and thus portions of two adjacent edges of the backer panel 211 will be located within the channel(s) 324d, 374d. As seen in FIG. 16B, a space 375d is maintained between the body portion 340d of the bracket 300d and the backer panel 211 due to the existence of the first and third vertical walls 320d, 370d. This space 375d provides a location for the hooks 461, 462 to be positioned when hanging the frame apparatus 200.

As can be seen in FIG. 16B, the backer panel 211 has a front surface 214, an opposite rear surface 215, and a peripheral edge 216 extending between the front and rear surfaces 214, 215. When the bracket 300 is coupled to the backer panel 211, a portion of the peripheral edge 216 of the backer panel 211 is inserted into the channel 374d of the mounting portion 345d of the bracket 300d so that the fourth horizontal wall 373d is adjacent (and possibly in contact with) the front surface 214 of the backer panel 211, the third horizontal wall 371d is adjacent (and possibly in contact with) the rear surface 215 of the backer panel 211, and the portion of the peripheral edge 216 of the backer panel 211 is adjacent to the fourth vertical wall 373d. Thus, the portion of the peripheral edge 216 of the backer panel 211 is positioned within the second elongated channel 374d. Although not shown in FIG. 16B, simultaneously an adjacent portion of the peripheral edge 216 of the backer panel 211 is inserted into the channel 324d of the mounting portion 345d of the bracket 300d so that the second horizontal wall 323d is adjacent (and possibly in contact with) the front surface 214 of the backer panel, the first horizontal wall 321d is adjacent (and possibly in contact with) the rear surface 215 of the backer panel 211, and the adjacent portion of the peripheral edge 216 of the backer panel 211 is adjacent to the second vertical wall 323d. Thus, the adjacent portion of the peripheral edge 216 of the backer panel 211 is positioned within the first elongated channel 324d. In this manner, the bracket 300 is readily and easily coupled to the backer panel 211 by sliding it over one of the corners of the backer panel.

Figure 16C:
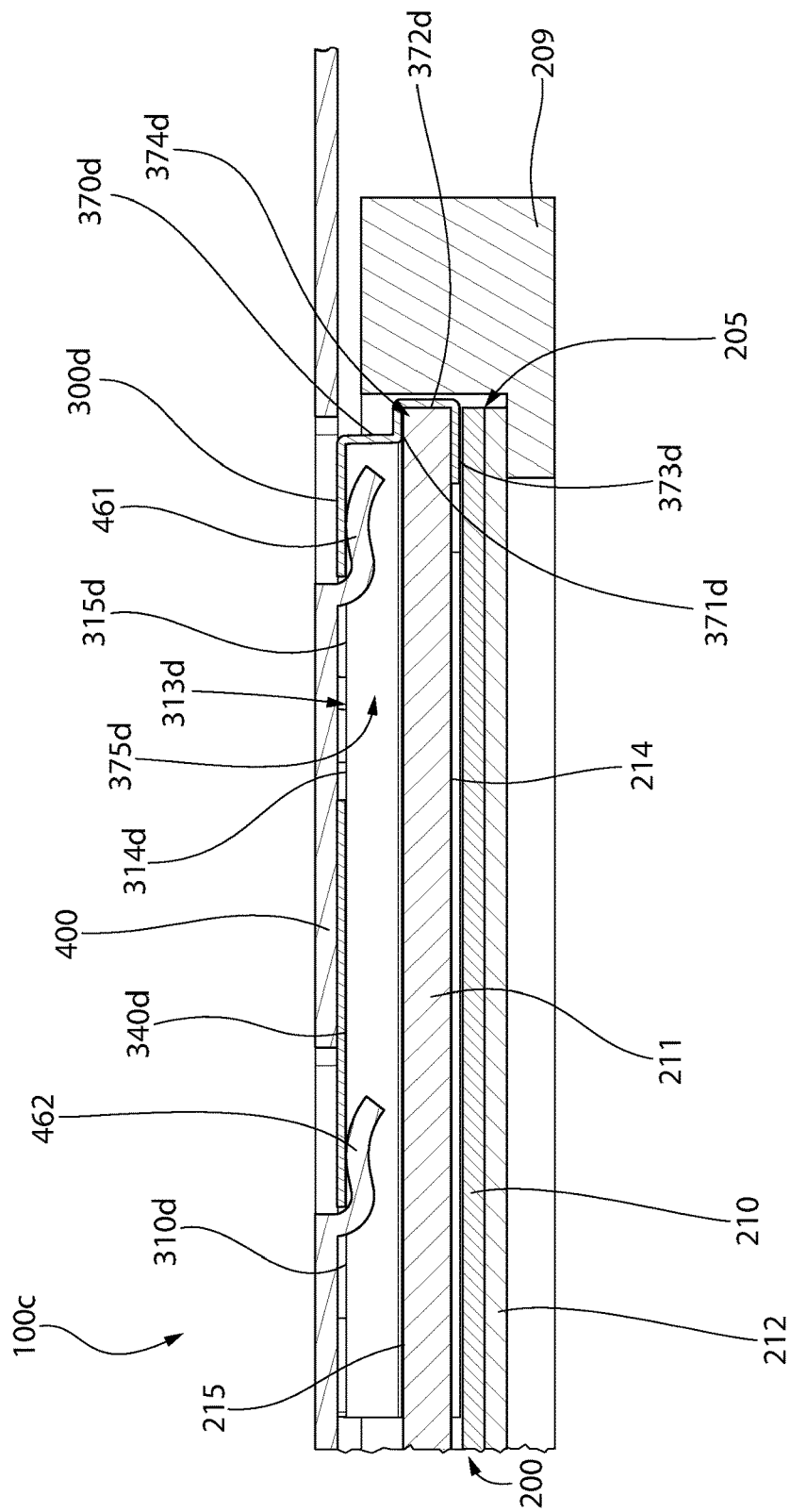
FIG. 16C is the cross-sectional view of FIG. 16A with the hanging apparatus in a fully assembled state.

FIG. 16C illustrates a cross-section of a portion of the hanging apparatus 100c fully assembled. The glazing 212, the display item 210, and the backer panel 211, with the bracket 300 already coupled thereto, are inserted into and nested within the rabbet 205 of the frame 209. As can be seen, the fourth horizontal wall 373d of the mounting portion 345d of the bracket 300d is trapped between the front surface 214 of the backer panel 211 and the display item 210. This acts to maintain the bracket 300d coupled to the frame apparatus 200 when the stack of the glazing 212 and the backer panel 211 are nested in the rabbet 205. The flex tabs (not illustrated in this figure) are then pivoted to secure the backer panel 211, the display item 210, and the glazing 212 within the rabbet 205. Specifically, the flex tabs will contact the rear surface 215 of the backer panel 211 to maintain the backer panel 211 (and hence also the display item 210 and the glazing 212) within the rabbet 205. Due to the bracket 300 being coupled to the backer panel 211 in the manner described herein and illustrated in the accompanying figures, the bracket 300 is also secured within the rabbet 205 when the flex tabs are pivoted. In FIG. 16C, the over-the-door hanging member 400 is coupled to the bracket 300d by inserting the hooks 461, 462 through one of the slots 310d, 311d and the aperture 313d of the bracket 300d. The hooks 461, 462 that are coupled to the bracket 300d within the slots 310d, 311d and the aperture 313d enter into the space 375d between the body portion 340d of the bracket 300d and the rear surface 215 of the backer panel 211.

When the over-the-door hanging member 400 is mounted to the bracket 300d with the bracket 300d coupled to the frame apparatus 200 as described herein, the over-the-door hanging member 400 may then be coupled to a top edge 501 of a door 500 as illustrated in FIG. 17. Specifically, the U-shaped member 458 of the over-the-door hanging member 400 can be mounted over the top edge 501 of the door 500. The elongated body 451 of the over-the-door hanging member then hangs down along one of the front or rear surfaces of the door to a desired hanging height for the hanging apparatus 100, 100a, 100b, 100c. When more than two hooks are provided on the over-the-door hanging members 400, the hanging height of the hanging apparatus 100, 100a, 100b, 100c may be modified/changed depending on which of the hooks is engaging the bracket 300.

Referring to FIG. 18, as noted above in some embodiments the over-the-door hanging member 400 may not be used. Rather, in some embodiments the bracket 300 may be coupled directly to a screw, nail or other piece hardware 600 that is coupled to and protruding from a support surface (i.e., a wall, a door, or the like). The hardware 600 may be inserted into the slots 310, 311, and the aperture 313. Alternatively and as illustrated, a portion of the bracket 300 that has a sawtooth configuration may rest on the hardware 600 to hang the hanging apparatus 100, 100a, 100b, 100c.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A hanging apparatus comprising:
    a frame comprising:
        a front surface and a rear surface opposite the front surface;
        an inner surface that defines a display opening;
        a rabbet defined by a horizontal surface and a vertical surface of the inner surface of the frame, the vertical surface of the inner surface of the frame comprising a first linear section, a second linear section opposite the first linear section, a third linear section, and a fourth linear section opposite the third linear section, each of the third and fourth linear sections extending between the first and second linear sections; and
        a channel formed into the vertical surface of the rabbet;
    a stack comprising a glazing and a backer panel positioned within the rabbet of the frame, the glazing forming a front surface of the stack and the backer panel forming a rear surface of the stack, a portion of the front surface of the stack resting atop the horizontal surface of the rabbet;
    a first bracket and a second bracket coupled to the frame on opposite sides of a longitudinal centerline of the frame, each of the first and second brackets comprising:
        a body portion comprising a peripheral edge that includes a first edge portion, a second edge portion extending perpendicularly from the first edge portion, and a third edge portion extending between the first and second edge portions, at least a portion of the third edge portion comprising a sawtooth configuration and at least one slot; and
        a mounting portion extending from each of the first and second edge portions of the body portion, the mounting portion comprising:
            a first vertical wall extending from the first edge portion of the peripheral edge of the body portion and a first horizontal wall extending from the first vertical wall in a direction away from the first edge portion; and
            a second vertical wall extending from the second edge portion of the peripheral edge of the body portion and a second horizontal wall extending from the second vertical wall in a direction away from the second edge portion; and
    wherein the first and second horizontal walls of the mounting portions of the first and second brackets nest within the channel to couple the first and second brackets to the frame;
    wherein the first edge portion of the peripheral edge of the body portion of the first bracket is adjacent to the first linear section of the vertical surface of the inner surface of the frame, the second edge portion of the peripheral edge of the body portion of the first bracket is adjacent to the third linear section of the vertical surface of the inner surface of the frame, and the third edge portion of the peripheral edge of the body portion of the first bracket extends between the first and third linear sections of the vertical surface of the inner surface of the frame; and
    wherein the first edge portion of the peripheral edge of the body portion of the second bracket is adjacent to the second linear section of the vertical surface of the inner surface of the frame, the second edge portion of the peripheral edge of the body portion of the second bracket is adjacent to the third linear section of the vertical surface of the inner surface of the frame, and the third edge portion of the peripheral edge of the body portion of the second bracket extends between the second and third linear sections of the vertical surface of the inner surface of the frame.

2. A hanging apparatus comprising:
    a frame comprising a front surface, a rear surface opposite the front surface, and an inner surface that defines an opening, a rabbet defined by a horizontal surface and a vertical surface of the inner surface of the frame, and a channel formed into the vertical surface;
    a stack positioned within the rabbet of the frame;
    at least one bracket comprising:
        a body portion comprising a peripheral edge that includes a first edge portion, a second edge portion extending perpendicularly from the first edge portion, and a third edge portion extending between the first and second edge portions, at least a portion of the third edge portion comprising a sawtooth configuration and at least one slot; and a mounting portion extending from each of the first and second edge portions of the body portion;

wherein at least a portion of the mounting portion of the bracket nests within the channel to couple the bracket to the frame and at least partially secure the stack within the rabbet.

3. The hanging apparatus according to claim 2 wherein the vertical surface of the inner surface of the frame comprises a first linear section, a second linear section opposite the first linear section, a third linear section, and a fourth linear section opposite the third linear section, each of the third and fourth linear sections extending between the first and second linear sections, and wherein the first edge portion of the peripheral edge of the body portion of the bracket is adjacent to the first linear section of the vertical surface of the inner surface of the frame, the second edge portion of the peripheral edge of the body portion of the bracket is adjacent to the third linear section of the vertical surface of the inner surface of the frame, and the third edge portion of the peripheral edge of the body portion of the bracket extends between the first and third linear sections of the vertical surface of the inner surface of the frame.

4. The hanging apparatus according to claim 2 further comprising:

a plurality of the brackets including a first bracket and a second bracket;

wherein the vertical surface of the inner surface of the frame comprises a first linear section, a second linear section opposite the first linear section, a third linear section, and a fourth linear section opposite the third linear section, each of the third and fourth linear sections extending between the first and second linear sections;

wherein the first edge portion of the peripheral edge of the body portion of the first bracket is adjacent to the first linear section of the vertical surface of the inner surface of the frame, the second edge portion of the peripheral edge of the body portion of the first bracket is adjacent to the third linear section of the vertical surface of the inner surface of the frame, and the third edge portion of the peripheral edge of the body portion of the first bracket extends between the first and third linear sections of the vertical surface of the inner surface of the frame; and wherein the first edge portion of the peripheral edge of the body portion of the second bracket is adjacent to the second linear section of the vertical surface of the inner surface of the frame, the second edge portion of the peripheral edge of the body portion of the second bracket is adjacent to the third linear section of the vertical surface of the inner surface of the frame, and the third edge portion of the peripheral edge of the body portion of the second bracket extends between the second and third linear sections of the of the vertical surface inner surface of the frame.

5. The hanging apparatus according to claim 2 wherein the stack comprises a first surface and an opposite second surface, a portion of the first surface of the stack resting atop the horizontal surface of the rabbet and the second surface of the stack being exposed at the rear surface of the frame, and wherein the portion of the third edge portion of the body portion of the bracket comprising the sawtooth configuration is spaced apart from the second surface of the stack by a gap.

6. The hanging apparatus according to claim 2 wherein the stack comprises a first surface and an opposite second surface, a portion of the first surface of the stack resting atop the horizontal surface of the rabbet and the second surface of the stack being exposed at the rear surface of the frame, and wherein at least a portion of the channel is located between the rear surface of the stack and the rear surface of the frame.

7. The hanging apparatus according to claim 2 wherein the channel extends continuously along an entirety of the vertical surface of the inner surface of the frame.

8. The hanging apparatus according to claim 7 wherein the mounting portion of the bracket comprises a first horizontal wall extending away from the first edge of the body portion of the bracket and a second horizontal wall extending away from the second edge of the body portion of the bracket, each of the first and second horizontal walls located within the channel to couple the bracket to the frame.

9. The hanging apparatus according to claim 2 wherein an exposed surface of the bracket is substantially flush with the rear surface of the frame.

10. The hanging apparatus according to claim 2 wherein the stack comprises a first surface and an opposite second surface, a portion of the first surface of the stack resting atop the horizontal surface of the rabbet, a first portion of the second surface of the stack being exposed at the rear surface of the frame, and a second portion of the second surface of the stack being covered by the body portion of the bracket.

11. The hanging apparatus according to claim 2 wherein the stack comprises a glazing and a backer panel, the glazing forming a front surface of the stack that rests atop the horizontal surface of the rabbet and the backer panel forming a rear surface of the stack that is exposed at the rear surface of the frame, and further comprising a display item positioned between the glazing and the backer panel.

12. The hanging apparatus according to claim 2 wherein the first edge portion of the peripheral edge of the body portion of the bracket extends along a first edge axis, the second edge portion of the peripheral edge of the body portion of the bracket extends along a second edge axis, and the third edge portion of the peripheral edge of the body portion of the bracket extends along a third edge axis, the first and second edge axes being perpendicular to one another and the third edge axis forming an acute angle with each of the first and second edge axes.

13. The hanging apparatus according to claim 2 wherein the mounting portion of the bracket further comprises:

a first vertical wall extending from the first edge portion of the peripheral edge of the body portion and a first horizontal wall extending from the first vertical wall in a direction away from the first edge portion;

a second vertical wall extending from the second edge portion of the peripheral edge of the body portion and a second horizontal wall extending from the second vertical wall in a direction away from the second edge portion; and wherein each of the first and second horizontal walls nests within the channel to couple the bracket to the frame.

14. The hanging apparatus according to claim 2 wherein the bracket wraps around a portion of the backer panel to couple the bracket to the backer panel.

15. A hanging apparatus comprising:

a frame comprising a front surface, a rear surface opposite the front surface, and an inner surface that defines an opening, a rabbet defined by a horizontal surface and a vertical surface of the inner surface of the frame, and a channel formed into the vertical surface;

a stack positioned within the rabbet of the frame;
at least one bracket comprising:
- a body portion comprising a peripheral edge that includes a first edge portion, a second edge portion extending perpendicularly from the first edge portion, and a third edge portion extending between the first and second edge portions, a first slot extending from the third edge portion towards the first edge portion and a second slot extending from the third edge portion towards the second edge portion; and
- a mounting portion extending from each of the first and second edge portions of the body portion;

wherein at least a portion of the mounting portion of the bracket nests within the channel to couple the bracket to the frame and at least partially secure the stack within the rabbet.

\* \* \* \* \*